(12) United States Patent
Kuniyoshi et al.

(10) Patent No.: US 12,512,156 B2
(45) Date of Patent: Dec. 30, 2025

(54) ARTIFICIAL SELECT GATE CUT FOR NAND

(71) Applicant: Sandisk Technologies, Inc., Milpitas, CA (US)

(72) Inventors: Yuki Kuniyoshi, Fujisawa (JP); Hardwell Chibvongodze, Hiratsuka (JP); Alvin Joshua, Fujisawa (JP); Akira Hanasaka, Fujisawa (JP); Akitomo Nakayama, Yokohama (JP)

(73) Assignee: Sandisk Technologies, Inc., Milpitas, CA (US)

( * ) Notice: Subject to any disclaimer, the term of this patent is extended or adjusted under 35 U.S.C. 154(b) by 177 days.

(21) Appl. No.: 18/482,996

(22) Filed: Oct. 9, 2023

(65) Prior Publication Data

US 2025/0118369 A1    Apr. 10, 2025

(51) Int. Cl.
*G11C 16/04* (2006.01)
*G11C 16/08* (2006.01)
*G11C 16/26* (2006.01)
*H01L 25/065* (2023.01)
*H10B 43/10* (2023.01)
*H10B 43/27* (2023.01)
*H10B 43/35* (2023.01)

(52) U.S. Cl.
CPC .......... *G11C 16/0483* (2013.01); *G11C 16/08* (2013.01); *G11C 16/26* (2013.01); *H01L 25/0657* (2013.01); *H01L 2225/06562* (2013.01); *H10B 43/10* (2023.02); *H10B 43/27* (2023.02); *H10B 43/35* (2023.02)

(58) Field of Classification Search
CPC ..... G11C 16/0483; G11C 16/08; G11C 16/26; H01L 25/0657; H01L 2225/06562; H10B 43/10; H10B 43/27; H10B 43/35
USPC ...................................... 365/185.11
See application file for complete search history.

(56) References Cited

U.S. PATENT DOCUMENTS 8,867,271 B2   10/2014   Li et al.
8,873,297 B2   10/2014   Yamada et al.
(Continued)

OTHER PUBLICATIONS

Kim, Byungryul, et al., "A High-Performance 1Tb 3b/Cell 3D-NAND Flash with a 194MB/s Write Throughput on over 300 Layers," ISSCC 2023, Session 28, IEEE International Solid-State Circuits Conference, Feb. 2023, 3 pages.

*Primary Examiner* — Tha-O H Bui
(74) *Attorney, Agent, or Firm* — Pearl Cohen Zedek Latzer Baratz LLP

(57) ABSTRACT

Technology is for managing non-volatile memory such as NAND memory. A memory system that programs the threshold voltages (Vt) of transistors on NAND strings to enable selection of sub-blocks without physically separate select lines in a block. A first set of one or more transistors on a NAND string may be programmed to a higher Vt and a second set of one or more transistors on the NAND string may be programmed to a lower Vt. Each NAND string in a sub-block may have the same pattern of high Vt and low Vt transistors. However, each sub-block has its own pattern of high Vt and low Vt transistors to enable selection of the sub-blocks. To select NAND strings in a sub-block, a high voltage is applied to a first set of the conductive lines and a low voltage is applied to a second set of the conductive lines.

20 Claims, 23 Drawing Sheets

| | SB0 | SB1 | SB2 | SB3 | SB4 |
|---|---|---|---|---|---|
| SGS4 | SGS_SEL | SGS_USEL | SGS_USEL | SGS_USEL | SGS_USEL |
| SGS3 | SGS_USEL | SGS_SEL | SGS_USEL | SGS_USEL | SGS_USEL |
| SGS2 | SGS_USEL | SGS_USEL | SGS_SEL | SGS_USEL | SGS_USEL |
| SGS1 | SGS_USEL | SGS_USEL | SGS_USEL | SGS_SEL | SGS_USEL |
| SGS0 | SGS_USEL | SGS_USEL | SGS_USEL | SGS_USEL | SGS_SEL |

(56) References Cited

U.S. PATENT DOCUMENTS

| | | | | |
|---|---|---|---|---|
| 8,908,435 B2* | 12/2014 | Li | ........................ | G11C 16/344 |
| | | | | 365/185.26 |
| 8,923,054 B1 | 12/2014 | Costa et al. | | |
| 9,015,407 B1 | 4/2015 | Dusija et al. | | |
| 9,715,938 B2 | 7/2017 | Yang et al. | | |
| 10,910,060 B1* | 2/2021 | Wu | ........................ | G11C 16/08 |

* cited by examiner

Figure 4B1
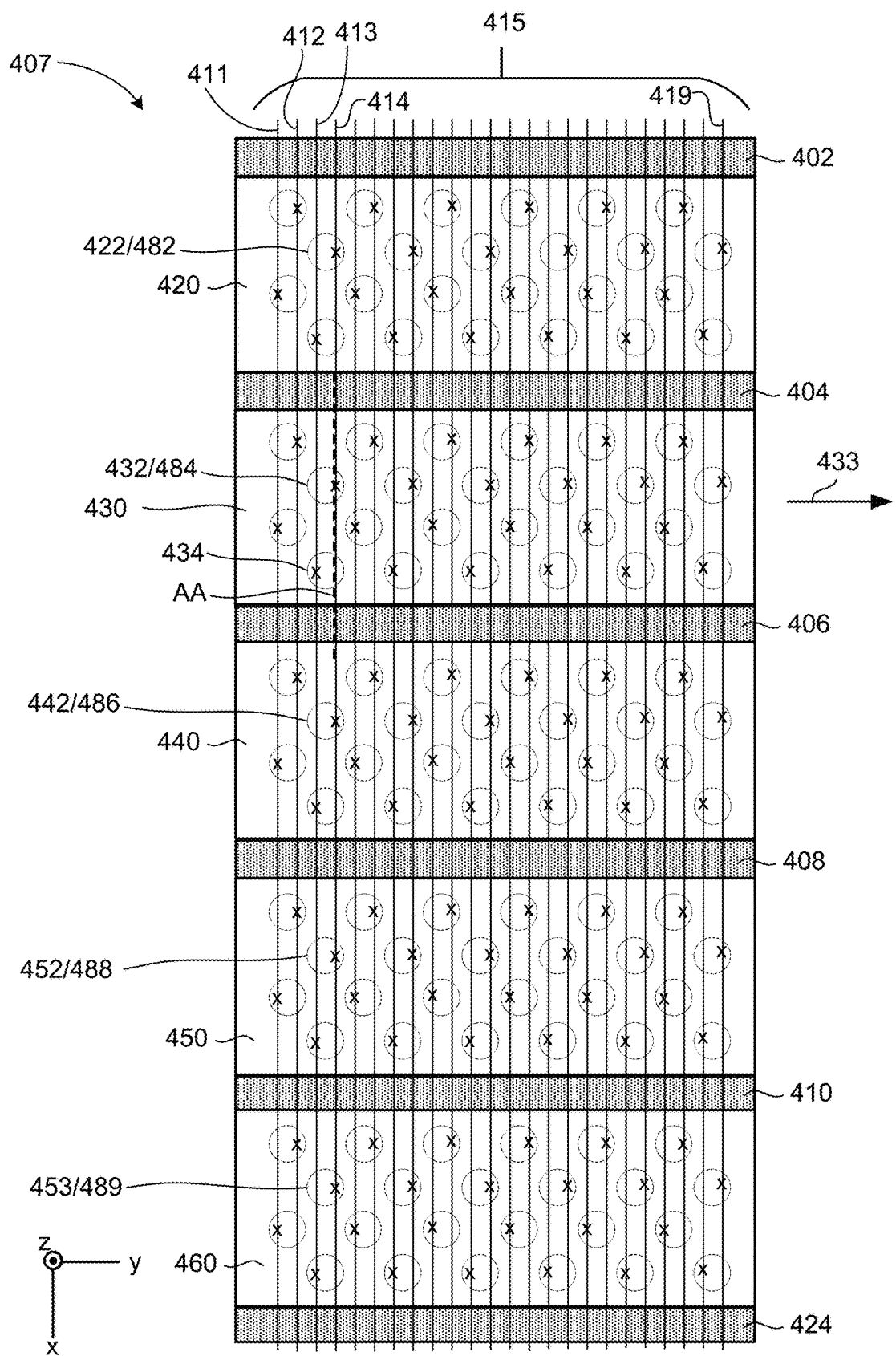

Figure 4B2
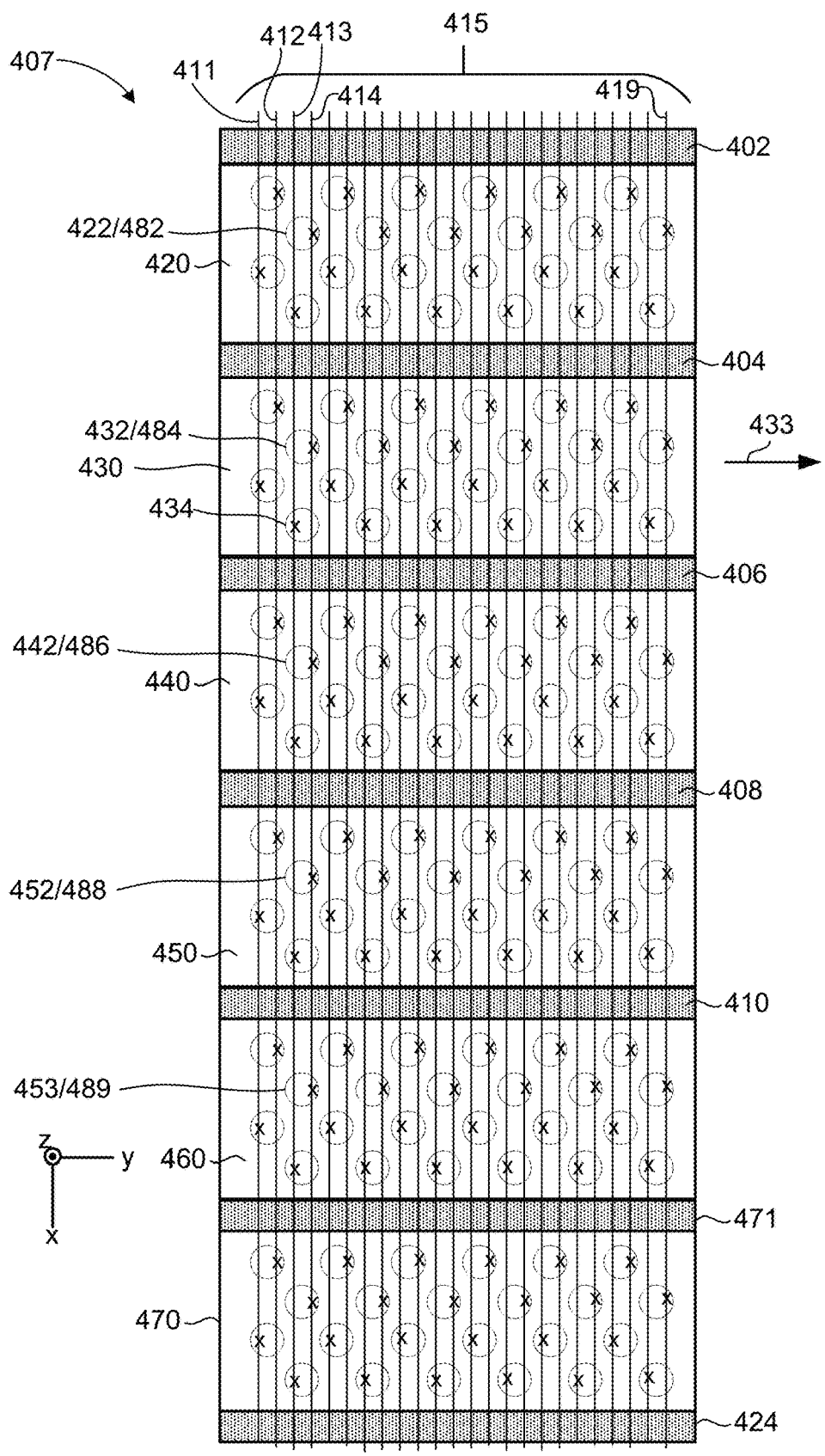

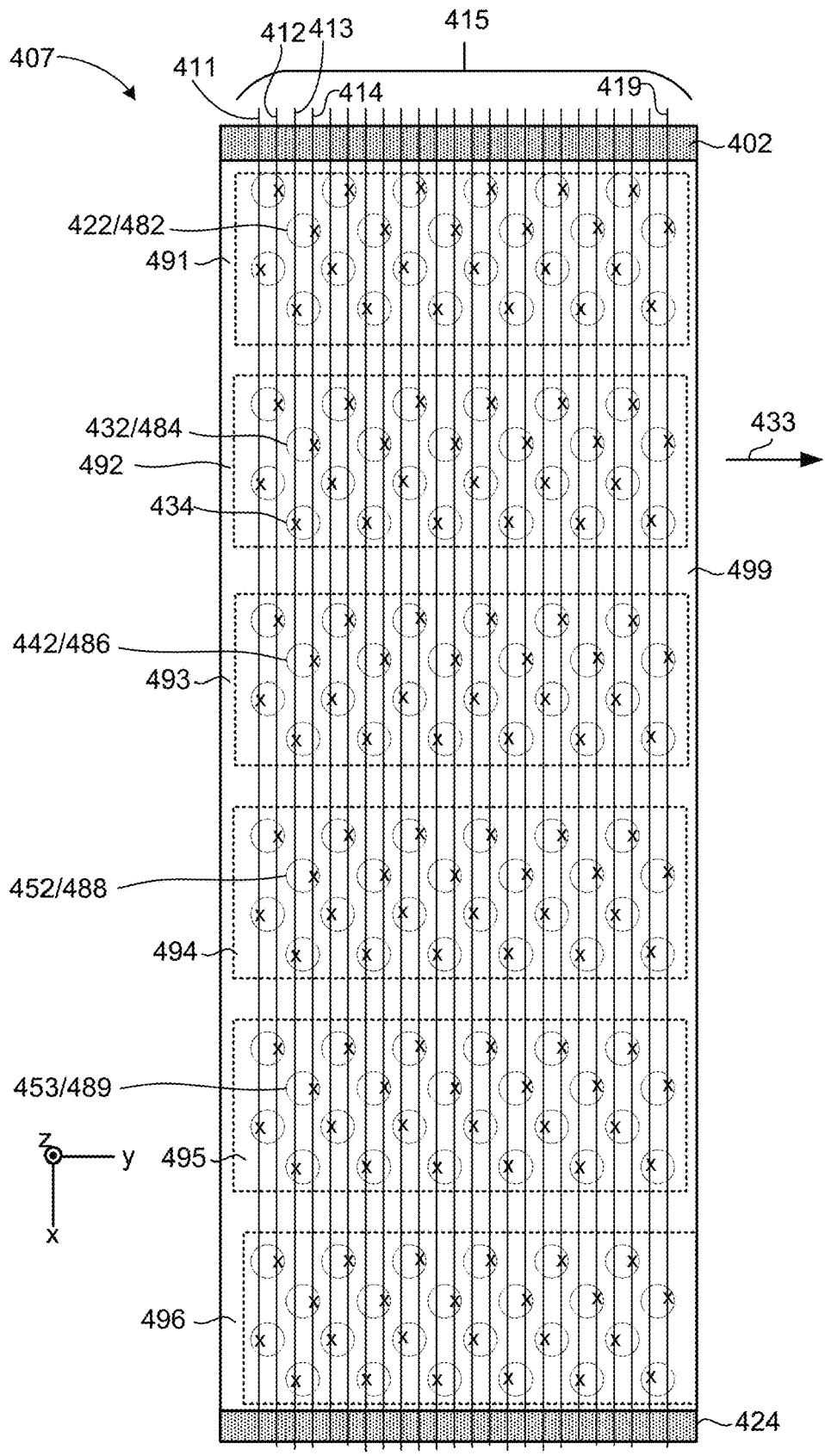
Figure 4B3

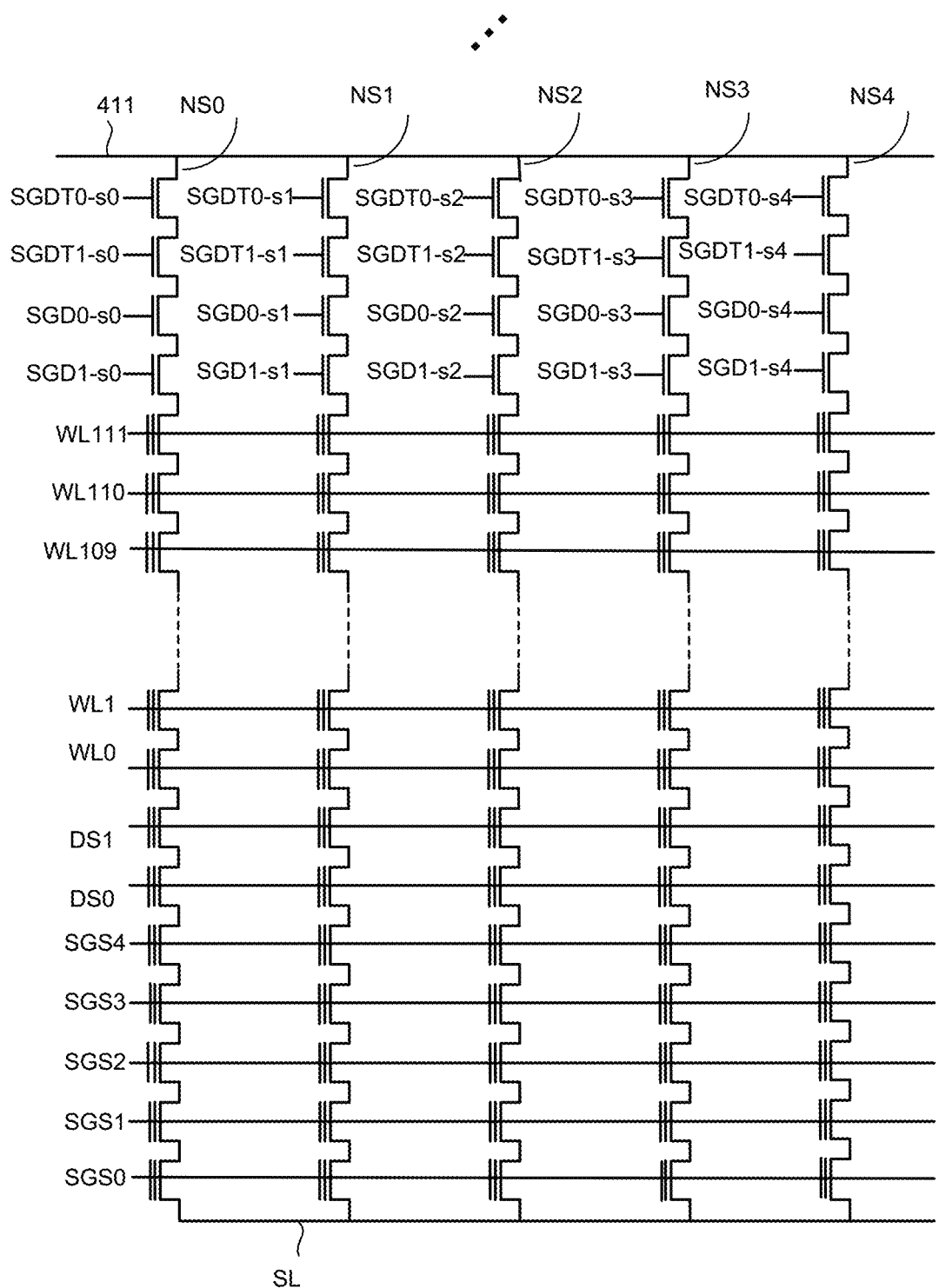
Figure 4E1

Figure 4E2
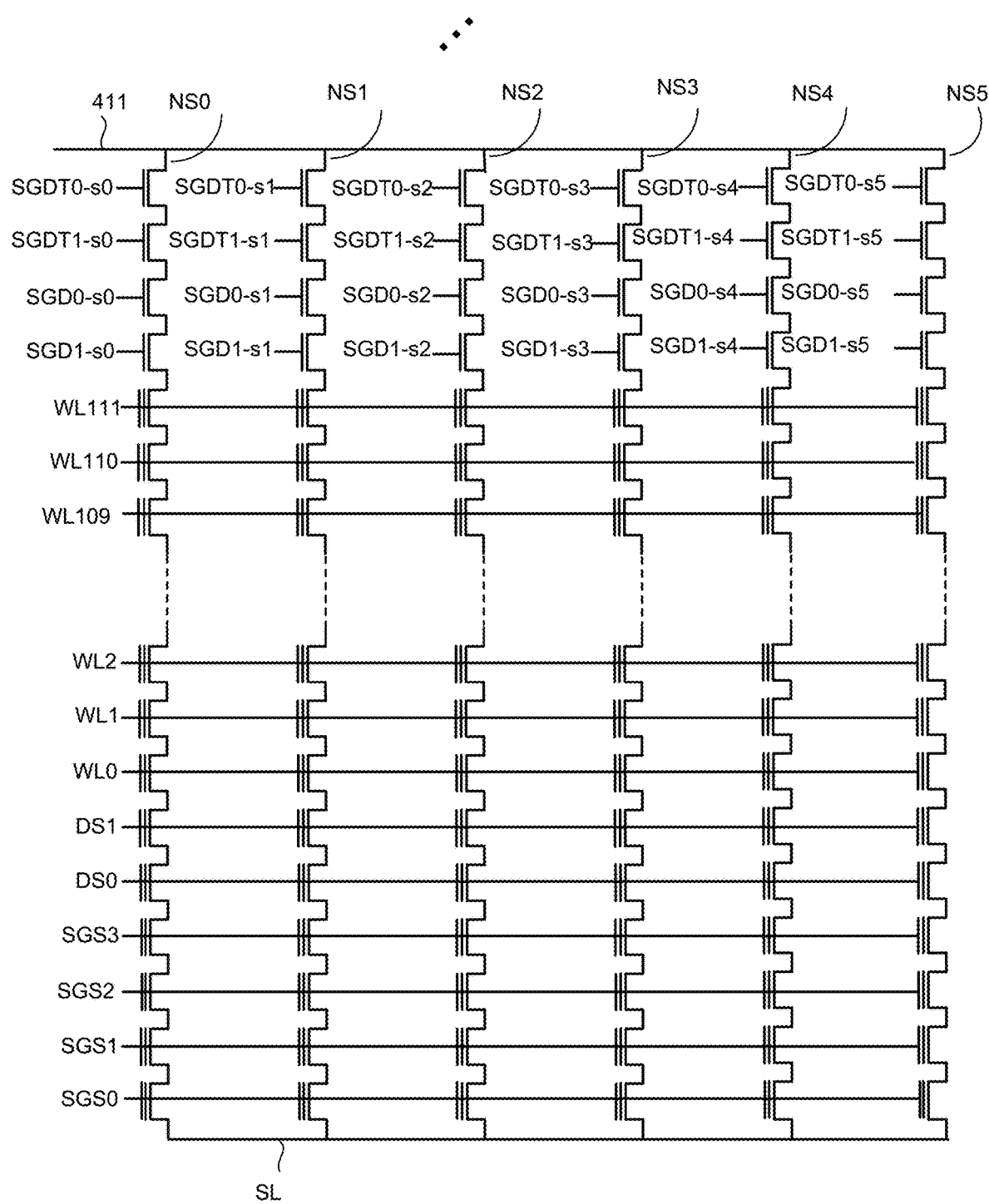

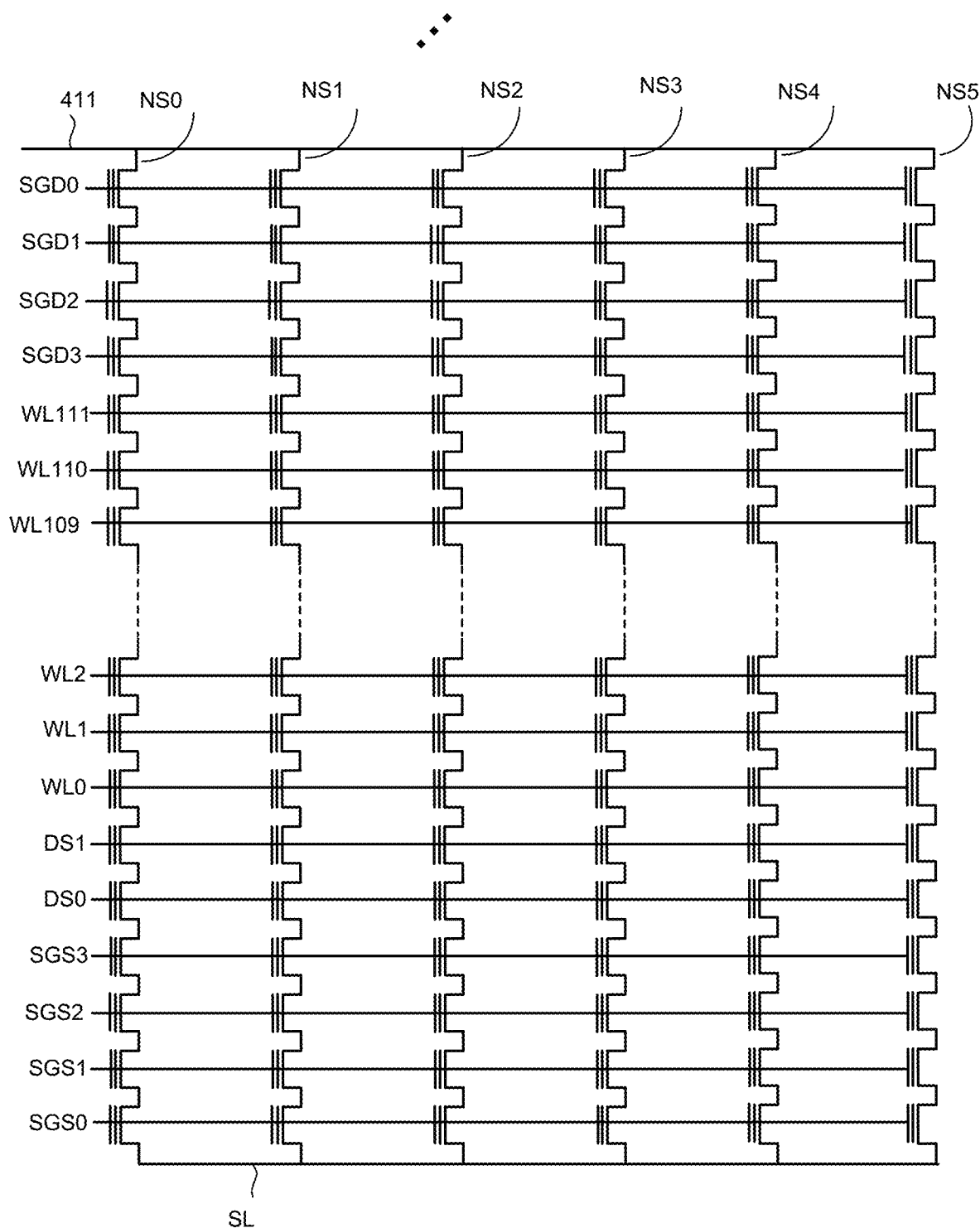
Figure 4E3

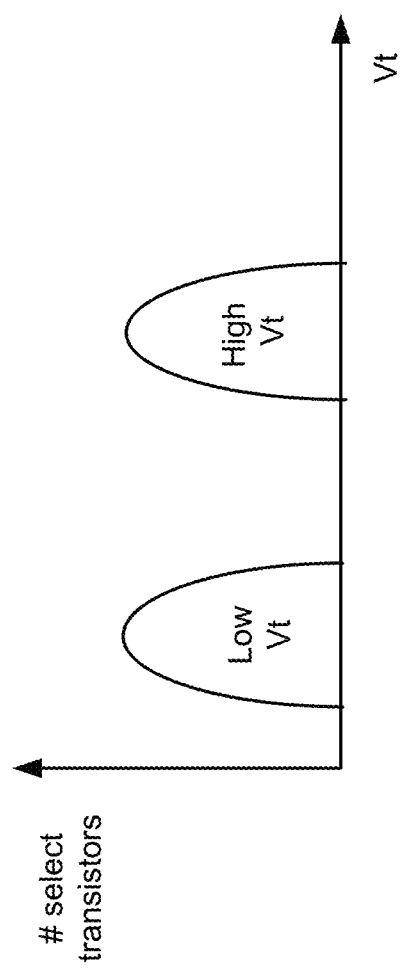

750

|  | SB0 | SB1 | SB2 | SB3 | SB4 |
|---|---|---|---|---|---|
| SGS4 | SGS_SEL | SGS_USEL | SGS_USEL | SGS_USEL | SGS_USEL |
| SGS3 | SGS_USEL | SGS_SEL | SGS_USEL | SGS_USEL | SGS_USEL |
| SGS2 | SGS_USEL | SGS_USEL | SGS_SEL | SGS_USEL | SGS_USEL |
| SGS1 | SGS_USEL | SGS_USEL | SGS_USEL | SGS_SEL | SGS_USEL |
| SGS0 | SGS_USEL | SGS_USEL | SGS_USEL | SGS_USEL | SGS_SEL |

850

|  | SB0 | SB1 | SB2 | SB3 | SB4 |
|---|---|---|---|---|---|
| DWL4 | DWL_SEL | DWL_USEL | DWL_USEL | DWL_USEL | DWL_USEL |
| DWL3 | DWL_USEL | DWL_SEL | DWL_USEL | DWL_USEL | DWL_USEL |
| DWL2 | DWL_USEL | DWL_USEL | DWL_SEL | DWL_USEL | DWL_USEL |
| DWL1 | DWL_USEL | DWL_USEL | DWL_USEL | DWL_SEL | DWL_USEL |
| DWL0 | DWL_USEL | DWL_USEL | DWL_USEL | DWL_USEL | DWL_SEL |

950

|  | SB0 | SB1 | SB2 | SB3 | SB4 | SB5 |
|---|---|---|---|---|---|---|
| SGS3 | SGS_SEL | SGS_SEL | SGS_SEL | SGS_USEL | SGS_USEL | SGS_USEL |
| SGS2 | SGS_SEL | SGS_USEL | SGS_USEL | SGS_SEL | SGS_SEL | SGS_USEL |
| SGS1 | SGS_USEL | SGS_SEL | SGS_USEL | SGS_SEL | SGS_USEL | SGS_SEL |
| SGS0 | SGS_USEL | SGS_USEL | SGS_SEL | SGS_USEL | SGS_SEL | SGS_SEL |

1050

|  | SB0 | SB1 | SB2 | SB3 | SB4 | SB5 |
|---|---|---|---|---|---|---|
| SGS3 | SGS_SEL | SGS_USEL | SGS_USEL | SGS_SEL | SGS_SEL | SGS_USEL |
| SGS2 | SGS_USEL | SGS_SEL | SGS_USEL | SGS_SEL | SGS_USEL | SGS_SEL |
| SGS1 | SGS_USEL | SGS_SEL | SGS_SEL | SGS_USEL | SGS_SEL | SGS_USEL |
| SGS0 | SGS_SEL | SGS_USEL | SGS_SEL | SGS_USEL | SGS_USEL | SGS_SEL |

1150

|  | SB0 | SB1 | SB2 | SB3 | SB4 | SB5 |
|---|---|---|---|---|---|---|
| SGD0 | SGD_SEL | SGD_SEL | SGD_SEL | SGD_USEL | SGD_USEL | SGD_USEL |
| SGD1 | SGD_SEL | SGD_USEL | SGD_USEL | SGD_SEL | SGD_SEL | SGD_USEL |
| SGD2 | SGD_USEL | SGD_SEL | SGD_USEL | SGD_SEL | SGD_USEL | SGD_SEL |
| SGD3 | SGD_USEL | SGD_USEL | SGD_SEL | SGD_USEL | SGD_SEL | SGD_SEL |

1200

1300

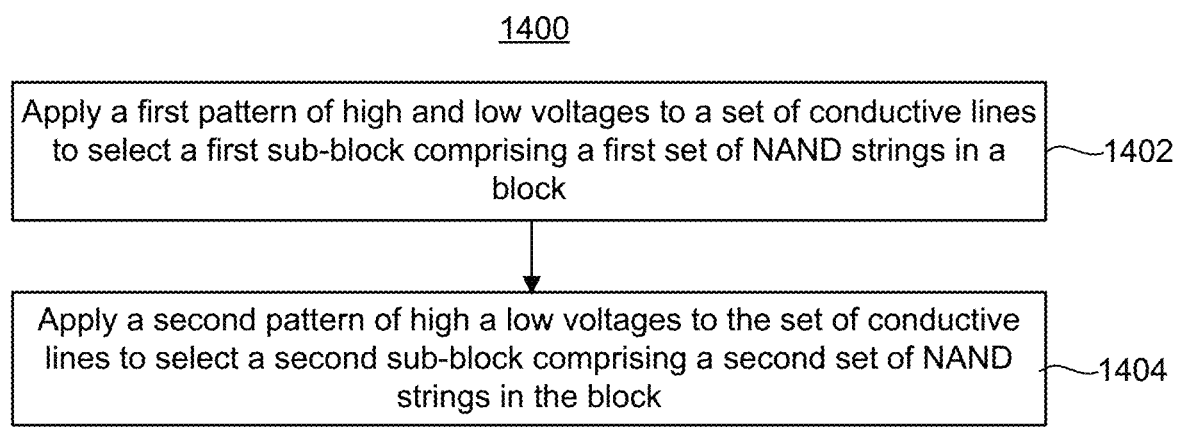

ARTIFICIAL SELECT GATE CUT FOR NAND

BACKGROUND

The present disclosure relates to non-volatile memory.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a source of power (e.g., a battery).

A memory structure in the memory system typically contains many memory cells and various control lines. The memory structure may be three-dimensional (3D). One type of 3D structure has non-volatile memory cells arranged as vertical NAND strings. The 3D memory structure may be arranged into units that are commonly referred to as blocks. For example, a block in a NAND memory system contains many NAND strings. A NAND string contains memory cell transistors connected in series, a drain side select gate at one end, and a source side select gate at the other end. The drain side select gate typically has one or more transistors in series. Likewise, the source side select gate typically has one or more transistors in series. Each NAND string is associated with a bit line. The block typically has many word lines that provide voltages to control gates of the memory cell transistors. For a 3D architecture, each word line resides at a different layer of the block. Therefore, each word line may connect to the control gate of one memory cell on each NAND string in the block.

For memory such as NAND, a large set of memory cells are erased prior to programming. Then, the memory cells are programmed one group at a time. The non-volatile memory cells may be programmed to store data. The unit of programming is typically referred to as a page of memory cells. Typically, the memory cells are programmed to a number of data states. Using a greater number of data states allows for more bits to be stored per memory cell. For example, four data states may be used to store two bits per memory cell, eight data states may be used in order to store three bits per memory cell, 16 data states may be used to store four bits per memory cell, etc. Some memory cells may be programmed to a data state by storing charge in the memory cell. For example, the threshold voltage (Vt) of a NAND memory cell can be set to a target Vt by programming charge into a charge storage region such as a charge trapping layer. The amount of charge stored in the charge trapping layer establishes the Vt of the memory cell.

For NAND memory, the memory cells that are involved in a program or read operation are typically connected to the same word line, which is referred to as the selected word line. In some architectures, the word lines extend in both the x- and y-direction across the entire block. However, this does not mean that all of the cells connected to the selected word line will be read or programmed together. In some architectures, a block of memory cells may be divided into sub-blocks to allow for memory operations to be performed on a smaller group of memory cells. The select gates at one or both ends of the NAND strings may be used to select the sub-blocks. A select gate may have more than one transistor in series. Select lines may be connected to control gates of the select transistor to control the select gates. The block could have multiple select lines at a particular level of the stack to allow sub-block selection. For example, at a particular level of the stack there could be multiple drain side select lines adjacent to the bit lines with each drain side select line being used to select one sub-block. Each drain side select line extends in one direction (e.g., the y-direction) across the block. The select lines are separated by an insulator to allow a select voltage to be applied to the select line for the selected sub-block and an unselect voltage to be applied to the select lines for the unselected sub-blocks.

In some architectures, there are multiple source side select lines adjacent to the source line(s) with each source side select line being used to select one sub-block. The source side select lines may be operated in concert with the drain select lines to select between the sub-blocks. However, fabricating the source select lines adds complexity and cost. For example, the word lines may extend in the x-direction and y-direction across the entire block. Thus, additional fabrication steps need to be performed to form the individual source side select lines of a block.

In other architectures, the source side select line(s) are similar in size to a word line in that the source side select line(s) extend in both the x- and y-direction across the entire block. However, the drain side select line(s) may still be used to select between different sub-blocks. However, with such an architecture the source side select line(s) cannot be used to select between the different sub-blocks. Moreover, the same voltage needs to be applied to the source side select gates of the unselected sub-blocks as is applied to the source side select gates of the selected sub-block, which has drawbacks.

BRIEF DESCRIPTION OF THE DRAWINGS

Like-numbered elements refer to common components in the different figures.

FIG. 4B1 is a block diagram depicting a top view of a portion of physical block of memory cells that is divided into five sub-regions.

FIG. 4B2 is a block diagram depicting a top view of a portion of physical block of memory cells that is divided into six sub-regions.

FIG. 4B3 is a block diagram depicting a view of a portion of physical block of memory cells that has contiguous region.

FIG. 4E1 is a schematic diagram of a portion of one example of a physical block, depicting several NAND strings consistent with the example in FIG. 4B1.

FIG. 4E2 is a schematic diagram of a portion of one example of a physical block, depicting several NAND strings consistent with the example in FIG. 4B2.

FIG. 4E3 is a schematic diagram of a portion of one example of a physical block, depicting several NAND strings consistent with the example in FIG. 4B3.

FIG. 6 is a graph of threshold voltage versus number of select transistors, and illustrates example threshold voltage distributions for select transistors.

FIG. 14 is a flowchart of one embodiment of a process of operating selecting a sub-block based on a voltage pattern.

DETAILED DESCRIPTION

Technology is disclosed herein for managing non-volatile memory such as NAND memory. One embodiment includes a memory system that programs the threshold voltages (Vt) of transistors on NAND strings to enable selection of sub-blocks without physically separate select lines in a block. A first set of one or more transistors on a NAND string may be programmed to a higher Vt and a second set of one or more transistors on the NAND string may be programmed to a lower Vt. Each NAND string in a sub-block may have the same pattern of high Vt and low Vt transistors. However, each sub-block has its own pattern of high Vt and low Vt transistors to enable selection of the sub-blocks. This selection may be performed from one or both ends of the NAND strings. In some embodiments, the transistors that are programmed to the high and low Vt are non-data cell transistors on NAND strings. A non-data cell transistor is a transistor that is not eligible to store data. Examples of non-data cell transistors include source side select transistors, drain side select transistors, and dummy memory cell transistors.

In one embodiment, to select NAND strings in a sub-block, a high (select) voltage is applied to a first set of the conductive lines and a low (unselect) voltage is applied to a second set of the conductive lines. Each conductive line in the first set is connected to a high Vt non-data cell transistor on each respective selected NAND string to turn on the high Vt non-data cell transistors of the selected NAND strings. Each conductive line in the second set is connected to a low Vt non-data cell transistor on each respective selected NAND string to turn on the low Vt non-data cell transistors of the selected NAND strings. Moreover, the conductive line(s) in the second set are connected to at least one high Vt non-data cell transistor of each unselected NAND string to keep off the high Vt non-data cell transistors of the unselected NAND strings. Therefore, separate sub-blocks can be selected without the need for electrically separate select lines, which saves complexity and cost when fabricating the memory blocks. Being able to select the sub-blocks without separate select lines may be referred to as an artificial select gate cut. Also, current consumption may be reduced relative to an architecture that relies on only one end of the block to select the sub-blocks.

Figure 1:
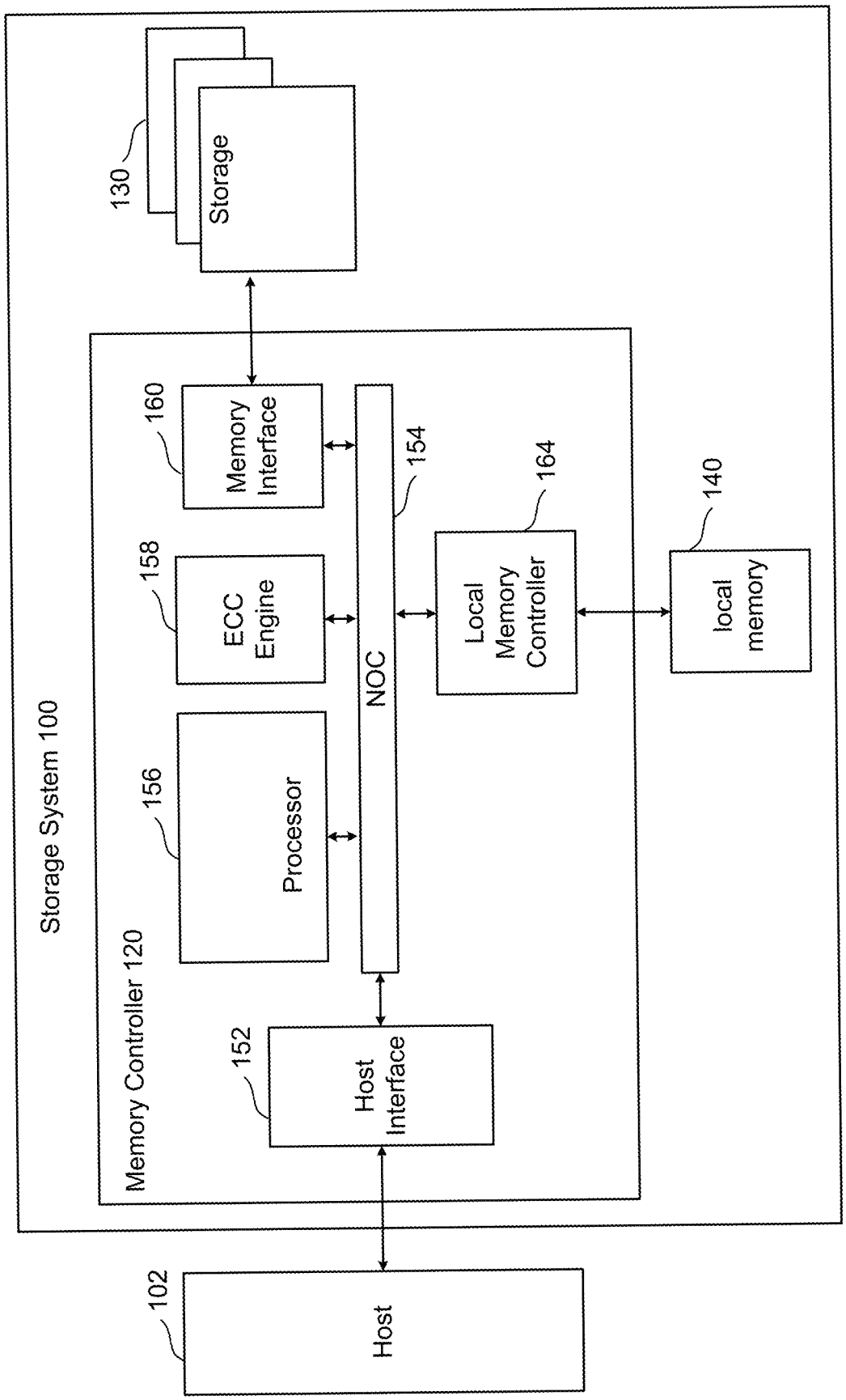
FIG. 1 is a block diagram depicting one embodiment of a storage system.

FIG. 1 is a block diagram of one embodiment of a storage system 100 that implements the technology described herein. In one embodiment, storage system 100 is a solid state drive ("SSD"). Storage system 100 may be referred to as a "non-volatile storage system." Storage system 100 can also be a memory card, USB drive or other type of storage system. The proposed technology is not limited to any one type of storage system. Storage system 100 is connected to host 102, which can be a computer, server, electronic device (e.g., smart phone, tablet or other mobile device), appliance, or another apparatus that uses memory and has data processing capabilities. In some embodiments, host 102 is separate from, but connected to, storage system 100. In other embodiments, storage system 100 is embedded within host 102.

The components of storage system 100 depicted in FIG. 1 are electrical circuits. Storage system 100 includes a memory controller 120 (or storage controller) connected to non-volatile storage 130 and optional local high speed memory 140 (e.g., DRAM, SRAM, MRAM). Note that local high speed memory 140 is optional. Local memory 140 is non-transitory memory, which may include volatile memory or non-volatile memory. Local high speed memory 140 is used by memory controller 120 to perform certain operations. For example, local high speed memory 140 may store logical to physical address translation tables ("L2P tables").

Memory controller 120 comprises a host interface 152 that is connected to and in communication with host 102. In one embodiment, host interface 152 implements an NVM Express (NVMe) over PCI Express (PCIe). Other interfaces can also be used, such as SCSI, SATA, etc. Host interface 152 is also connected to a network-on-chip (NOC) 154. A NOC is a communication subsystem on an integrated circuit. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of systems on a chip (SoC) and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, NOC 154 can be replaced by a bus. Connected to and in communication with NOC 154 is processor 156, ECC engine 158, memory interface 160, and local memory controller 164. Local memory controller 164 is used to operate and communicate with local high speed memory 140 (e.g., DRAM, SRAM, MRAM).

ECC engine 158 performs error correction services. For example, ECC engine 158 performs data encoding and decoding. In one embodiment, ECC engine 158 is an electrical circuit programmed by software. For example, ECC engine 158 can be a processor that can be programmed. In other embodiments, ECC engine 158 is a custom and dedicated hardware circuit without any software. In another embodiment, the function of ECC engine 158 is implemented by processor 156.

Processor 156 performs the various controller memory operations, such as programming, erasing, reading, and memory management processes. In one embodiment, processor 156 is programmed by firmware. In other embodiments, processor 156 is a custom and dedicated hardware circuit without any software. Processor 156 also implements a translation module, as a software/firmware process or as a dedicated hardware circuit. In many systems, the non-volatile memory is addressed internally to the storage system using physical addresses associated with one or more memory die in storage 130. However, the host system will use logical addresses to address the various memory locations. This enables the host to assign data to consecutive logical addresses, while the storage system is free to store the data as it wishes among the locations of the one or more memory die. To implement this system, memory controller 120 (e.g., the translation module) performs address translation between the logical addresses used by the host and the physical addresses used by the memory die. One example implementation is to maintain tables (i.e. the L2P tables mentioned above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the local memory 140 cannot hold all of the L2P tables. In such a case, the entire set of L2P tables are stored in a storage 130 and a subset of the L2P tables are cached (L2P cache) in the local high speed memory 140.

Memory interface 160 communicates with non-volatile storage 130. In one embodiment, memory interface provides a Toggle Mode interface. Other interfaces can also be used. In some example implementations, memory interface 160 (or another portion of controller 120) implements a scheduler and buffer for transmitting data to and receiving data from one or more memory die.

Figure 2A:
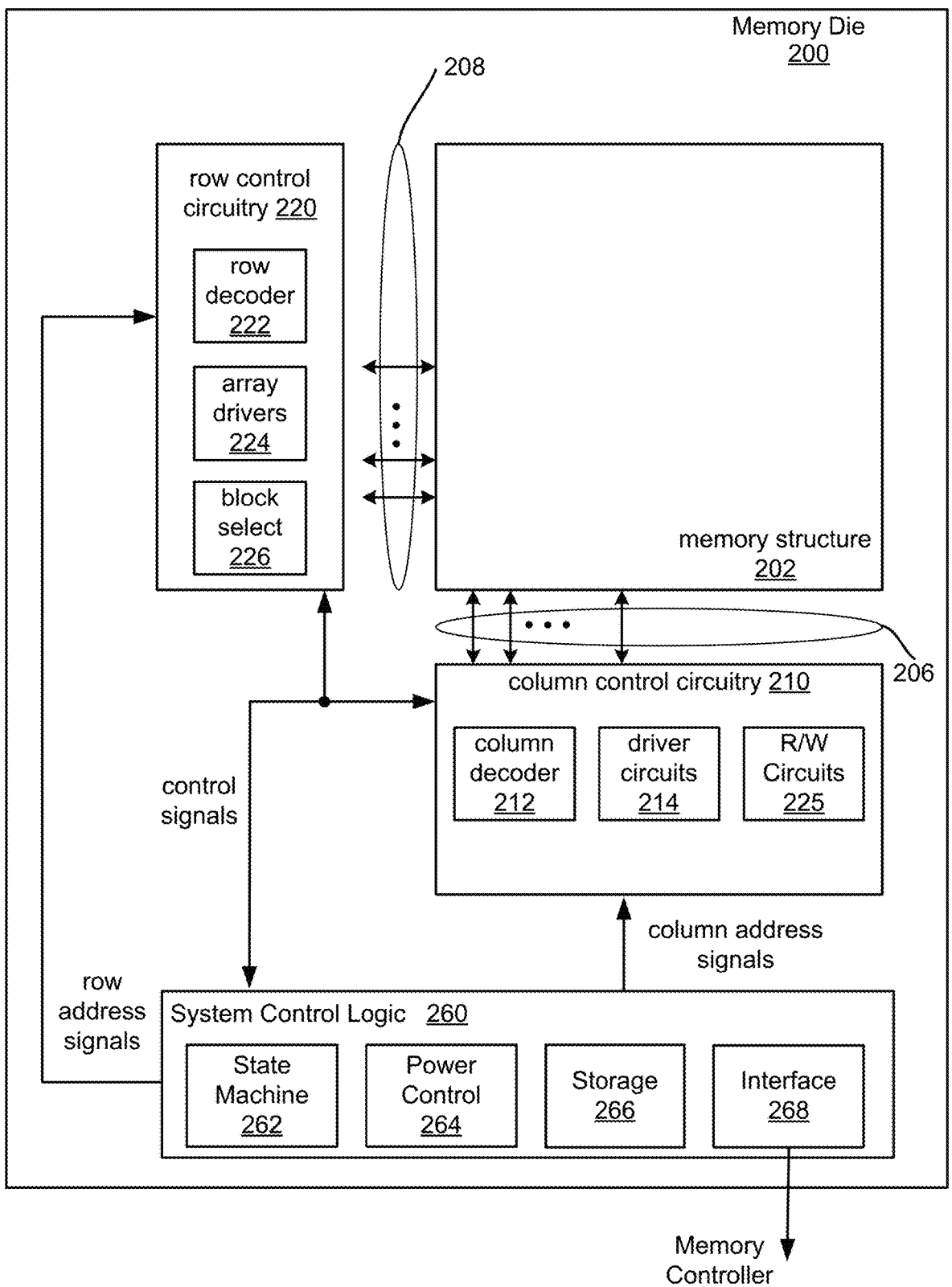
FIG. 2A is a block diagram of one embodiment of a memory die.

In one embodiment, non-volatile storage 130 comprises one or more memory dies. FIG. 2A is a functional block diagram of one embodiment of a memory die 200 that comprises non-volatile storage 130. Each of the one or more memory dies of non-volatile storage 130 can be implemented as memory die 200 of FIG. 2A. The components depicted in FIG. 2A are electrical circuits. Memory die 200 includes a memory structure 202 (e.g., memory array) that can comprise non-volatile memory cells (also referred to as non-volatile storage cells), as described in more detail below.

The array terminal lines of memory structure 202 include the various layer(s) of word lines organized as rows, and the various layer(s) of bit lines organized as columns. However, other orientations can also be implemented. Memory die 200 includes row control circuitry 220, whose outputs are connected to respective word lines of the memory structure 202. Row control circuitry 220 receives a group of M row address signals and one or more various control signals from System Control Logic circuit 260, and typically may include such circuits as row decoders 222, array drivers 224, and block select circuitry 226 for both reading and writing (programming) operations. Row control circuitry 220 may also include read/write circuitry. Memory die 200 also includes column control circuitry 210 including read/write circuits 225. The read/write circuits 225 may contain sense amplifiers and data latches. The sense amplifier(s) input/outputs are connected to respective bit lines of the memory structure 202. Although only a single block is shown for structure 202, a memory die can include multiple arrays that can be individually accessed. Column control circuitry 210 receives a group of N column address signals and one or more various control signals from System Control Logic 260, and typically may include such circuits as column decoders 212, array terminal receivers or driver circuits 214, as well as read/write circuitry 225, and I/O multiplexers.

System control logic 260 receives data and commands from memory controller 120 and provides output data and status to the host. In some embodiments, the system control logic 260 (which comprises one or more electrical circuits) includes state machine 262 that provides die-level control of memory operations. In one embodiment, the state machine 262 is programmable by software. In other embodiments, the state machine 262 does not use software and is completely implemented in hardware (e.g., electrical circuits). In another embodiment, the state machine 262 is replaced by a micro-controller or microprocessor, either on or off the memory chip. System control logic 260 can also include a power control module 264 that controls the power and voltages supplied to the rows and columns of the memory structure 202 during memory operations. System control logic 260 includes storage 266 (e.g., RAM, registers, latches, etc.), which may be used to store parameters for operating the memory structure 202.

Commands and data are transferred between memory controller 120 and memory die 200 via memory controller interface 268 (also referred to as a "communication interface"). Memory controller interface 268 is an electrical interface for communicating with memory controller 120. Examples of memory controller interface 268 include a Toggle Mode Interface and an Open NAND Flash Interface (ONFI). Other I/O interfaces can also be used.

In some embodiments, all the elements of memory die 200, including the system control logic 260, can be formed as part of a single die. In other embodiments, some or all of the system control logic 260 can be formed on a different die than the die that contains the memory structure 202.

In one embodiment, memory structure 202 comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping layers.

In another embodiment, memory structure 202 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 202 is not limited to the examples above. Many different types of memory array architectures or memory technologies can be used to form memory structure 202. No particular non-volatile memory technology is required for purposes of the new claimed embodiments proposed herein. Other examples of suitable technologies for memory cells of the memory structure 202 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 202 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 2A can be grouped into two parts: (1) memory structure 202 and (2) peripheral circuitry, which includes all of the other components depicted in FIG. 2A. An important characteristic of a memory circuit is its capacity, which can be increased by increasing the area of the memory die of storage system 100 that is given over to the memory structure 202; however, this reduces the area of the memory die available for the peripheral circuitry. This can place quite severe restrictions on these elements of the peripheral circuitry. For example, the need to fit sense amplifier circuits within the available area can be a significant restriction on sense amplifier design architectures. With respect to the system control logic 260, reduced availability of area can limit the available functionalities that can be implemented on-chip. Consequently, a basic trade-off in the design of a memory die for the storage system 100 is the amount of area to devote to the memory structure 202 and the amount of area to devote to the peripheral circuitry.

Another area in which the memory structure 202 and the peripheral circuitry are often at odds is in the processing involved in forming these regions, since these regions often involve differing processing technologies and the trade-off in having differing technologies on a single die. For example, when the memory structure 202 is NAND flash, this is an NMOS structure, while the peripheral circuitry is often CMOS based. For example, elements such sense amplifier circuits, charge pumps, logic elements in a state machine, and other peripheral circuitry in system control logic 260 often employ PMOS devices. Processing operations for manufacturing a CMOS die will differ in many aspects from the processing operations optimized for an NMOS flash NAND memory or other memory cell technologies. Three-dimensional NAND structures (see, for example, FIG. 4) in particular may benefit from specialized processing operations.

To improve upon these limitations, embodiments described below can separate the elements of FIG. 2A onto separately formed dies that are then bonded together. More specifically, the memory structure 202 can be formed on one die (referred to as the memory die) and some or all of the peripheral circuitry elements, including one or more control circuits, can be formed on a separate die (referred to as the control die). For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate control die. This allows each of the memory die to be optimized individually according to its technology. For example, a NAND memory die can be optimized for an NMOS based memory array structure, without worrying about the CMOS elements that have now been moved onto a control die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other die. Although the following will focus on a bonded memory circuit of one memory die and one control die, other embodiments can use more dies, such as two memory dies and one control die, for example.

Figure 2B:
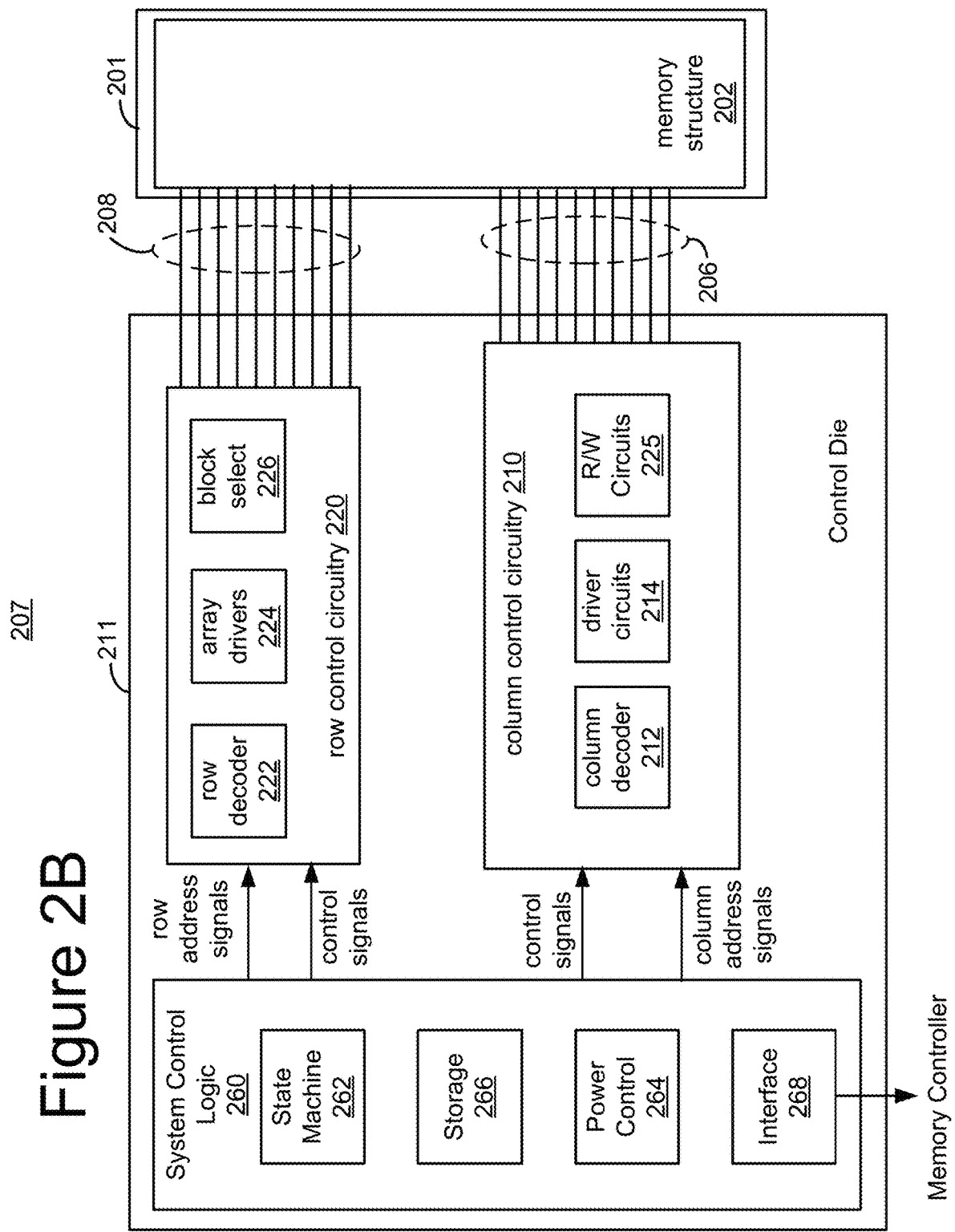
FIG. 2B is a block diagram of one embodiment of an integrated memory assembly.

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 207. One or more integrated memory assemblies 207 may be used to implement the non-volatile storage 130 of storage system 100. The integrated memory assembly 207 includes two types of semiconductor dies (or more succinctly, "die"). Memory structure die 201 includes memory structure 202. Memory structure 202 includes non-volatile memory cells. Control die 211 includes control circuitry 260, 210, and 220 (as described above). In some embodiments, control die 211 is configured to connect to the memory structure 202 in the memory structure die 201. In some embodiments, the memory structure die 201 and the control die 211 are bonded together.

FIG. 2B shows an example of the peripheral circuitry, including control circuits, formed in a peripheral circuit or control die 211 coupled to memory structure 202 formed in memory structure die 201. Common components are labelled similarly to FIG. 2A. System control logic 260, row control circuitry 220, and column control circuitry 210 are located in control die 211. In some embodiments, all or a portion of the column control circuitry 210 and all or a portion of the row control circuitry 220 are located on the memory structure die 201. In some embodiments, some of the circuitry in the system control logic 260 is located on the on the memory structure die 201.

System control logic 260, row control circuitry 220, and column control circuitry 210 may be formed by a common process (e.g., CMOS process), so that adding elements and functionalities, such as ECC, more typically found on a memory controller 120 may require few or no additional process steps (i.e., the same process steps used to fabricate controller 120 may also be used to fabricate system control logic 260, row control circuitry 220, and column control circuitry 210). Thus, while moving such circuits from a die such as memory structure die 201 may reduce the number of steps needed to fabricate such a die, adding such circuits to a die such as control die 211 may not require many additional process steps. The control die 211 could also be referred to as a CMOS die, due to the use of CMOS technology to implement some or all of control circuitry 260, 210, 220.

FIG. 2B shows column control circuitry 210 including read/write circuits 225 on the control die 211 coupled to memory structure 202 on the memory structure die 201 through electrical paths 206. For example, electrical paths 206 may provide electrical connection between column decoder 212, driver circuitry 214, and R/W circuits 225 and bit lines of memory structure 202. Electrical paths may extend from column control circuitry 210 in control die 211 through pads on control die 211 that are bonded to corresponding pads of the memory structure die 201, which are connected to bit lines of memory structure 202. Each bit line of memory structure 202 may have a corresponding electrical path in electrical paths 206, including a pair of bond pads, which connects to column control circuitry 210. Similarly, row control circuitry 220, including row decoder 222, array drivers 224, and block select 226 are coupled to memory structure 202 through electrical paths 208. Each electrical path 208 may correspond to a word line, dummy word line, or select gate line. Additional electrical paths may also be provided between control die 211 and memory structure die 201.

For purposes of this document, the phrases "a control circuit" or "one or more control circuits" can include, but is not limited to, any one of or any combination of memory controller 120, state machine 262, power control 264, all or a portion of system control logic 260, all or a portion of row control circuitry 220, all or a portion of column control circuitry 210, read/write circuits 225, sense amps, a microcontroller, a microprocessor, and/or other similar functioned circuits. A control circuit can include hardware only or a combination of hardware and software (including firmware). For example, a controller programmed by firmware to perform the functions described herein is one example of a control circuit. A control circuit can include a processor, FPGA, ASIC, integrated circuit, or other type of circuit.

For purposes of this document, the term "apparatus" can include, but is not limited to, one or more of, storage system 100, storage 130, memory die 200, integrated memory assembly 207, and/or control die 211.

Figure 3A:
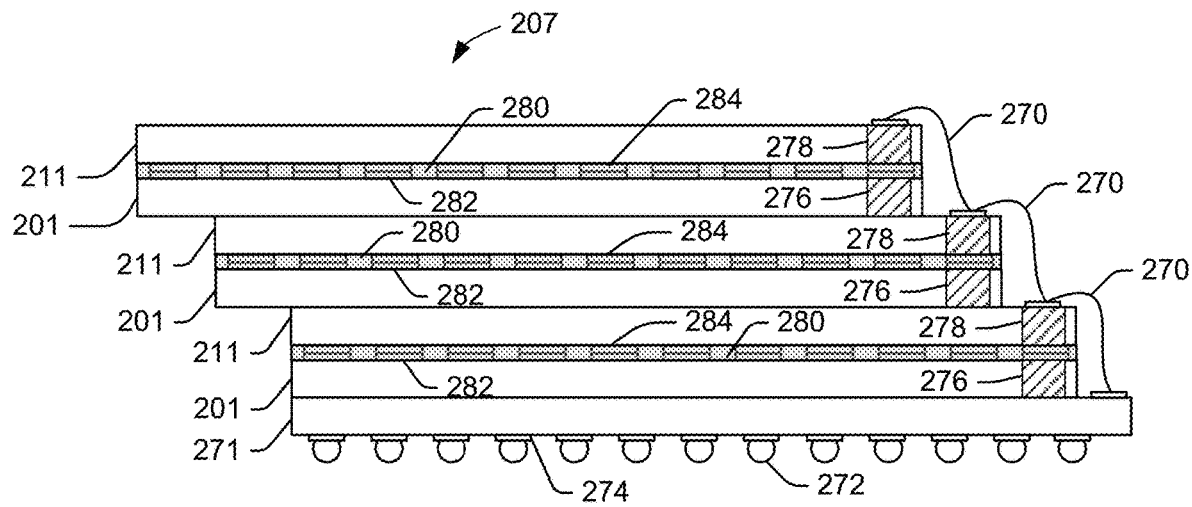
FIGS. 3A and 3B depict different embodiments of integrated memory assemblies.

In some embodiments, there is more than one control die 211 and more than one memory structure die 201 in an integrated memory assembly 207. In some embodiments, the integrated memory assembly 207 includes a stack of multiple control dies 211 and multiple memory structure dies 201. FIG. 3A depicts a side view of an embodiment of an integrated memory assembly 207 stacked on a substrate 271 (e.g., a stack comprising control die 211 and memory structure die). The integrated memory assembly 207 has three control dies 211 and three memory structure dies 201. In some embodiments, there are more than three memory structure dies 201 and more than three control dies 211. In FIG. 3A there are an equal number of memory structure dies 201 and control dies 211; however, in one embodiment, there are more memory structure dies 201 than control dies 211. For example, one control die 211 could control multiple memory structure dies 201.

Each control die 211 is affixed (e.g., bonded) to at least one of the memory structure die 201. Some of the bond pads 282/284 are depicted. There may be many more bond pads. A space between two die 201, 211 that are bonded together is filled with a solid layer 280, which may be formed from epoxy or other resin or polymer. This solid layer 280 protects the electrical connections between the die 201, 211, and further secures the die together. Various materials may be used as solid layer 280.

The integrated memory assembly 207 may for example be stacked with a stepped offset, leaving the bond pads at each level uncovered and accessible from above. Wire bonds 270 connected to the bond pads connect the control die 211 to the substrate 271. A number of such wire bonds may be formed across the width of each control die 211 (i.e., into the page of FIG. 3A).

A memory die through silicon via (TSV) 276 may be used to route signals through a memory structure die 201. A control die through silicon via (TSV) 278 may be used to route signals through a control die 211. The TSVs 276, 278 may be formed before, during or after formation of the integrated circuits in the semiconductor dies 201, 211. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package. The solder balls 272 may form a part of the interface between integrated memory assembly 207 and memory controller 120.

Figure 3B:
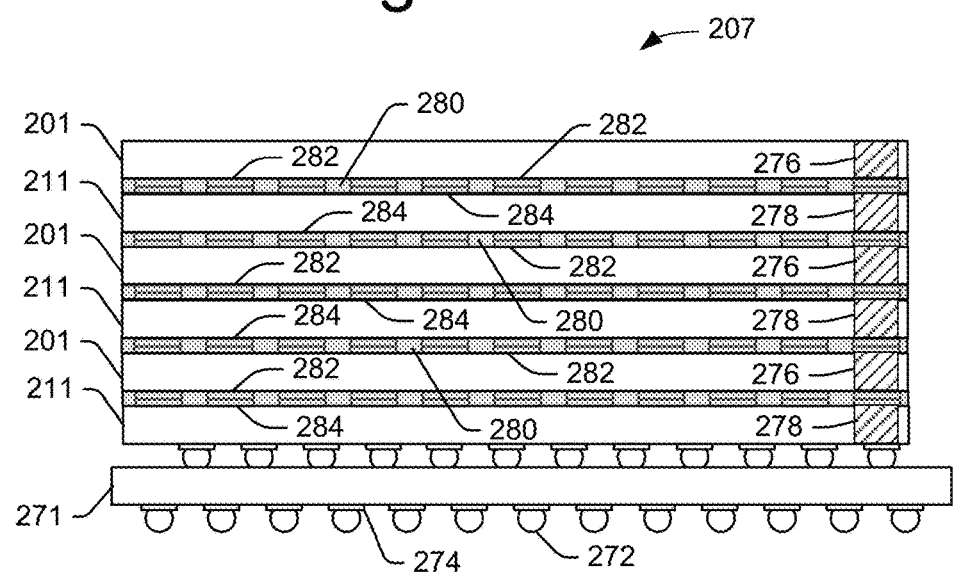

FIG. 3B depicts a side view of another embodiment of an integrated memory assembly 207 stacked on a substrate 271. The integrated memory assembly 207 of FIG. 3B has three control dies 211 and three memory structure dies 201. In some embodiments, there are many more than three memory structure dies 201 and many more than three control dies 211. In this example, each control die 211 is bonded to at least one memory structure die 201. Optionally, a control die 211 may be bonded to two or more memory structure dies 201.

Some of the bond pads 282, 284 are depicted. There may be many more bond pads. A space between two dies 201, 211 that are bonded together is filled with a solid layer 280, which may be formed from epoxy or other resin or polymer. In contrast to the example in FIG. 3A, the integrated memory assembly 207 in FIG. 3B does not have a stepped offset. A memory die through silicon via (TSV) 276 may be used to route signals through a memory structure die 201. A control die through silicon via (TSV) 278 may be used to route signals through a control die 211.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package.

As has been briefly discussed above, the control die 211 and the memory structure die 201 may be bonded together. Bond pads on each die 201, 211 may be used to bond the two die together. In some embodiments, the bond pads are bonded directly to each other, without solder or other added material, in a so-called Cu-to-Cu bonding process. In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension. Such bonds may be formed at room temperature, though heat may also be applied. In embodiments using Cu-to-Cu bonding, the bond pads may be about 5 µm square and spaced from each other with a pitch of 5 µm to 5 µm. While this process is referred to herein as Cu-to-Cu bonding, this term may also apply even where the bond pads are formed of materials other than Cu.

When the area of bond pads is small, it may be difficult to bond the semiconductor die together. The size of, and pitch between, bond pads may be further reduced by providing a film layer on the surfaces of the semiconductor die including the bond pads. The film layer is provided around the bond pads. When the die are brought together, the bond pads may bond to each other, and the film layers on the respective die may bond to each other. Such a bonding technique may be referred to as hybrid bonding. In embodiments using hybrid bonding, the bond pads may be about 5 µm square and spaced from each other with a pitch of 1 µm to 5 µm. Bonding techniques may be used providing bond pads with even smaller sizes and pitches.

Some embodiments may include a film on surface of the dies 201, 211. Where no such film is initially provided, a space between the die may be under filled with an epoxy or other resin or polymer. The under-fill material may be applied as a liquid which then hardens into a solid layer. This under-fill step protects the electrical connections between the dies 201, 211, and further secures the die together. Various materials may be used as under-fill material.

Figure 4:
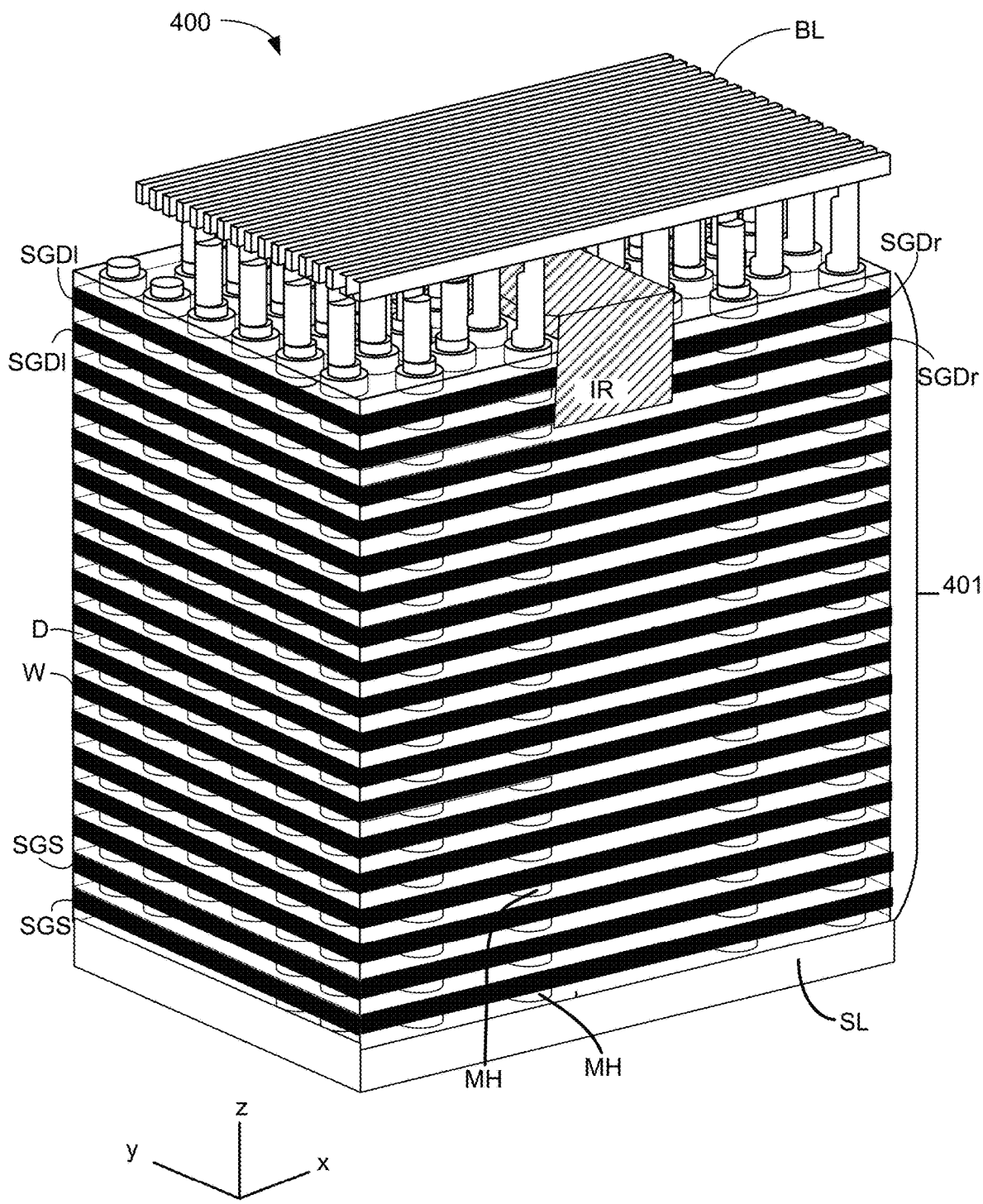
FIG. 4 is a perspective view of a portion of one example of a monolithic three dimensional memory structure.

FIG. 4 is a perspective view of a portion of one example of a monolithic three dimensional memory array/structure that can comprise memory structure 202, which includes a plurality non-volatile memory cells arranged as vertical NAND strings. For example, FIG. 4 shows a portion 400 of one block of memory. The structure depicted includes a set of bit lines BL positioned above a stack 401 of alternating dielectric layers and conductive layers. For example purposes, one of the dielectric layers is marked as D and one of the conductive layers (also called word line layers) is marked as W. The number of alternating dielectric layers and conductive layers can vary based on specific implementation requirements. In one embodiment the alternating dielectric layers and conductive layers are divided into five (or a different number of) regions (e.g., sub-blocks) by isolation regions IR. FIG. 4 shows one isolation region IR separating two sub-blocks. The top two conductive layers each have two SGD lines depicted (SGDr, SGDl). Thus, right SGDr lines may be used to select the right sib-block and the left SGD lines SGDl may be used to select the left sub-block.

Below the alternating dielectric layers and word line layers is a source line layer SL. Above the source line layer SL are two source lines (SGS). Each SGS line extends across the entire block. Memory holes are formed in the stack of alternating dielectric layers and conductive layers. For example, one of the memory holes is marked as MH. Note that in FIG. 4, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells. Each memory cell can store one or more bits of data. More details of the three dimensional monolithic memory array that comprises memory structure 202 is provided below.

Figure 4A:
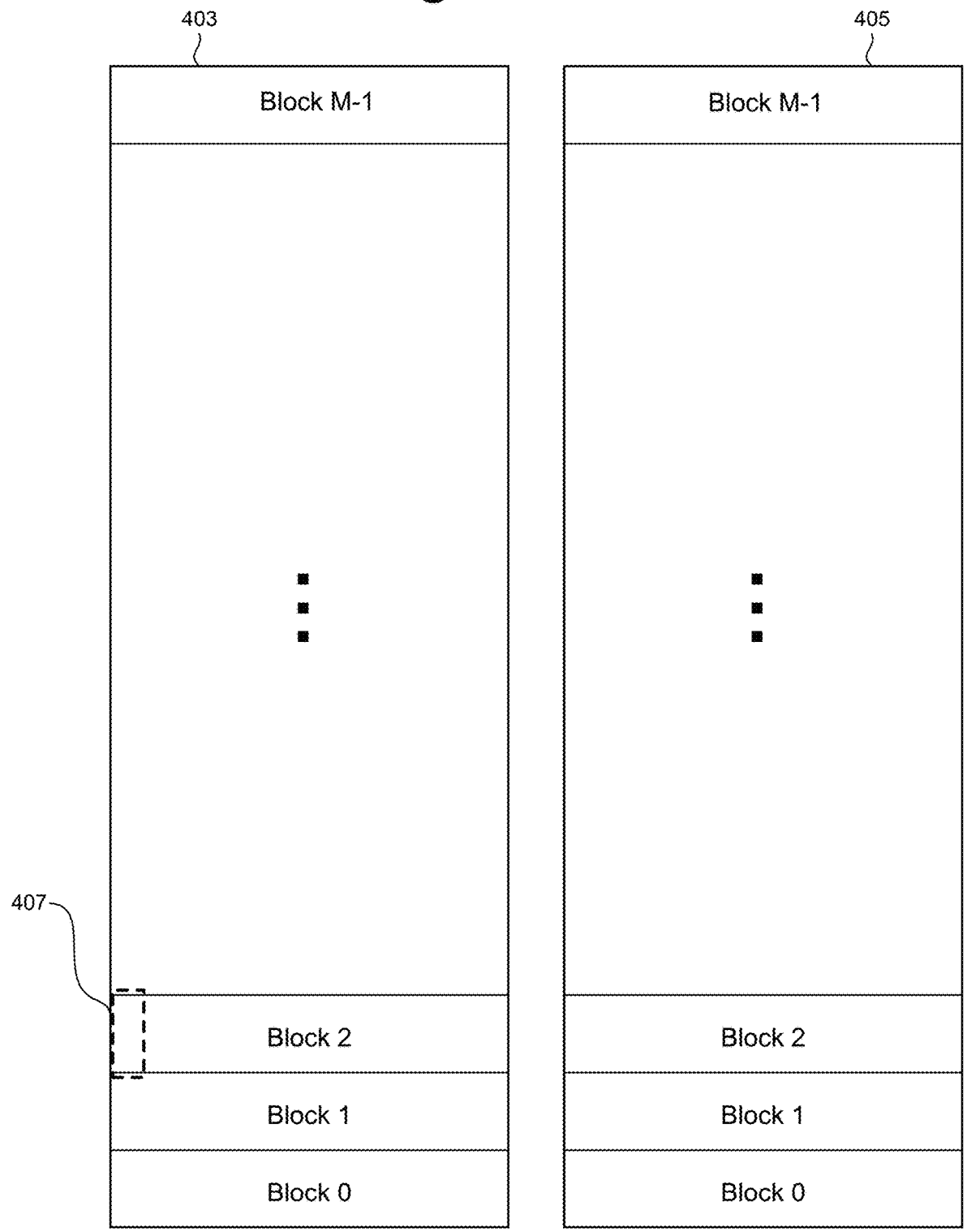
FIG. 4A is a block diagram of one example of a memory structure having two planes.

FIG. 4A is a block diagram explaining one example organization of memory structure 202, which is divided into two planes 403 and 405. Each plane is then divided into M physical blocks. In one example, each plane has about 2000 physical blocks. However, different numbers of physical blocks and planes can also be used. In one embodiment, a physical block of memory cells is a unit of erase. That is, all memory cells of a physical block are erased together. In other embodiments, physical blocks can be divided into sub-blocks and the sub-blocks can be the unit of erase. Memory cells can also be grouped into physical blocks for other reasons, such as to organize the memory structure to enable the signaling and selection circuits. In some embodiments, a physical block represents a group of connected memory cells as the memory cells of a block share a common set of word lines. For example, the word lines for a physical block are all connected to all of the vertical NAND strings for that physical block. Although FIG. 4A shows two planes 403/405, more or fewer than two planes can be implemented. In some embodiments, memory structure 202 includes four planes. In some embodiments, memory structure 202 includes eight planes. In some embodiments, programming can be performed in parallel in a first selected block in plane 403 and a second selected block in plane 405.

FIGS. 4B1-4E3 depict example three dimensional ("3D") NAND structures that can be used to implement memory structure 202 of FIGS. 2A and 2B. FIG. 4B1 is a diagram depicting a layer of a portion 407 of Block 2 that is divided into different regions. Each region may serve as a select line to select a different sub-block. The layer may be, for example, the top layer. As can be seen from FIG. 4B1, the physical block depicted in FIG. 4B1 extends in the direction of arrow 433. In one embodiment, the memory array has many layers; however, FIG. 4B1 only shows the top layer.

FIG. 4B1 depicts a plurality of circles that represent the vertical columns. Each of the vertical columns include multiple select transistors (also referred to as a select gate or selection gate) and multiple memory cells. In one embodiment, each vertical column implements a NAND string. For example, FIG. 4B1 depicts vertical columns 422, 432, 442, 452 and 453. Vertical column 422 implements NAND string 482. Vertical column 432 implements NAND string 484. Vertical column 442 implements NAND string 486. Vertical column 452 implements NAND string 488. Vertical column 453 implements NAND string 486. Vertical column 452 implements NAND string 489. More details of the vertical columns are provided below. Since the physical block depicted in FIG. 4B1 extends in the direction of arrow 433, the physical block includes more vertical columns than depicted in FIG. 4B1.

FIG. 4B1 also depicts a set of bit lines 415, including bit lines 411, 412, 413, 414, . . . 419. FIG. 4B1 shows twenty-four bit lines because only a portion of the physical block is depicted. It is contemplated that more than twenty-four bit lines connected to vertical columns of the physical block. Each of the circles representing vertical columns has an "x" to indicate its connection to one bit line. For example, bit line 414 is connected to vertical columns 422, 432, 442 and 452.

The physical block depicted in FIG. 4B1 includes a set of isolation regions 402, 404, 406, 408, 410, and 424, which may be formed of SiO$_2$; however, other dielectric materials can also be used. Isolation regions 402, 404, 406, 408, 410, and 424 serve to divide the top layers of the physical block into five regions; for example, the top layer depicted in FIG. 4B1 is divided into regions 420, 430, 440, 450, and 460. Each region 420, 430, 440, 450, and 460 in the layer may serve as a select line to select a different sub-block. In one embodiment, isolation regions 402 and 424 separate the physical block 407 from adjacent physical blocks. Thus, isolation regions 402 and 424 may extend down to the substrate. In one embodiment, the isolation regions 404, 406, 408, and 410 only divide the layers used to implement the drain select gate (SGD) so that NAND strings in different sub-blocks can be independently selected. Referring back to FIG. 4, the IR region may correspond to any of isolation regions 404, 406, 408, or 410. In one example implementation, a bit line only connects to one vertical column/NAND string in each of regions (sub-blocks) 420, 430, 440, 450, and 460. In that implementation, each physical block has twenty rows of active columns and each bit line connects to five rows in each block. In one embodiment, all of the five vertical columns/NAND strings connected to a common bit line are connected to the same word line (or set of word lines); therefore, the system uses the drain side selection lines to choose one (or another subset) of the five to be subjected to a memory operation (program, verify, read, and/or erase).

Although FIG. 4B1 shows each region (420, 430, 440, 450, 460) having four rows of vertical columns, five regions (420, 430, 440, 450, 460) and twenty rows of vertical columns in a block, those exact numbers are an example implementation. Other embodiments may include more or fewer regions (420, 430, 440, 450, 460) per block, more or fewer rows of vertical columns per region and more or fewer rows of vertical columns per block. FIG. 4B1 also shows the vertical columns being staggered. In other embodiments, different patterns of staggering can be used. In some embodiments, the vertical columns are not staggered.

FIG. 4B2 depicts an alternative top layer that is divided into six regions 420, 430, 440, 450, 460, and 470. Each region 420, 430, 440, 450, 460, and 470 in the layer may serve as a select line (e.g., SGD) to select a different sub-block. In one embodiment, isolation regions 402 and 424 separate the physical block 407 from adjacent physical blocks. Thus, isolation regions 402 and 424 may extend down to the substrate. In one embodiment, the isolation regions 404, 406, 408, 410, and 471 only divide the layers used to implement drain select gate so that NAND strings in different sub-blocks can be independently selected.

FIG. 4B3 depicts an alternative top layer that has a single contiguous conductive region 499. This top layer does not have the isolation regions 404, 406, 408, 410, and 471. However, the transistors are depicted in six groups 491, 492, 493, 494, 495, 496 similar to the regions 420, 430, 440, 450, 460, 470 in FIG. 4B2. Because there is one contiguous conductive region 499 the same voltage is applied to the control gates of all of the transistors at this layer. In an embodiment, the Vt of the transistors is used to allow sub-block selection. In an embodiment, the Vts will either be what is referred to herein as a high Vt or a low Vt. Each transistor in one or more regions 420, 430, 440, 450, 460, 470 of this layer may be programmed to the high Vt. Therefore, each transistor in the rest of the regions in this layer may be programmed to the low Vt. Note that other layers may also have a similar structure as depicted in FIG. 4B3, but with a different pattern of high Vt or low Vt. Further details of selecting the sub-blocks will be discussed below. In an embodiment, the source side select gate layers are formed from a single contiguous region similar to the example layer in FIG. 4B3. In an embodiment, the Vt of the SGS select transistors is used to allow sub-block selection. Note that although six groups 491, 492, 493, 494, 495, 496 are shown in FIG. 4B3, more or fewer than six groups may be used. In an embodiment in which the layer is one of the SGS layers, the number of groups in the contiguous conductive SGS layer is equal to the number of electrically separated regions in the SGD layer. Moreover, each group in the SGS layer has the same NAND strings as a corresponding region in the SGD layer.

Figure 4C:
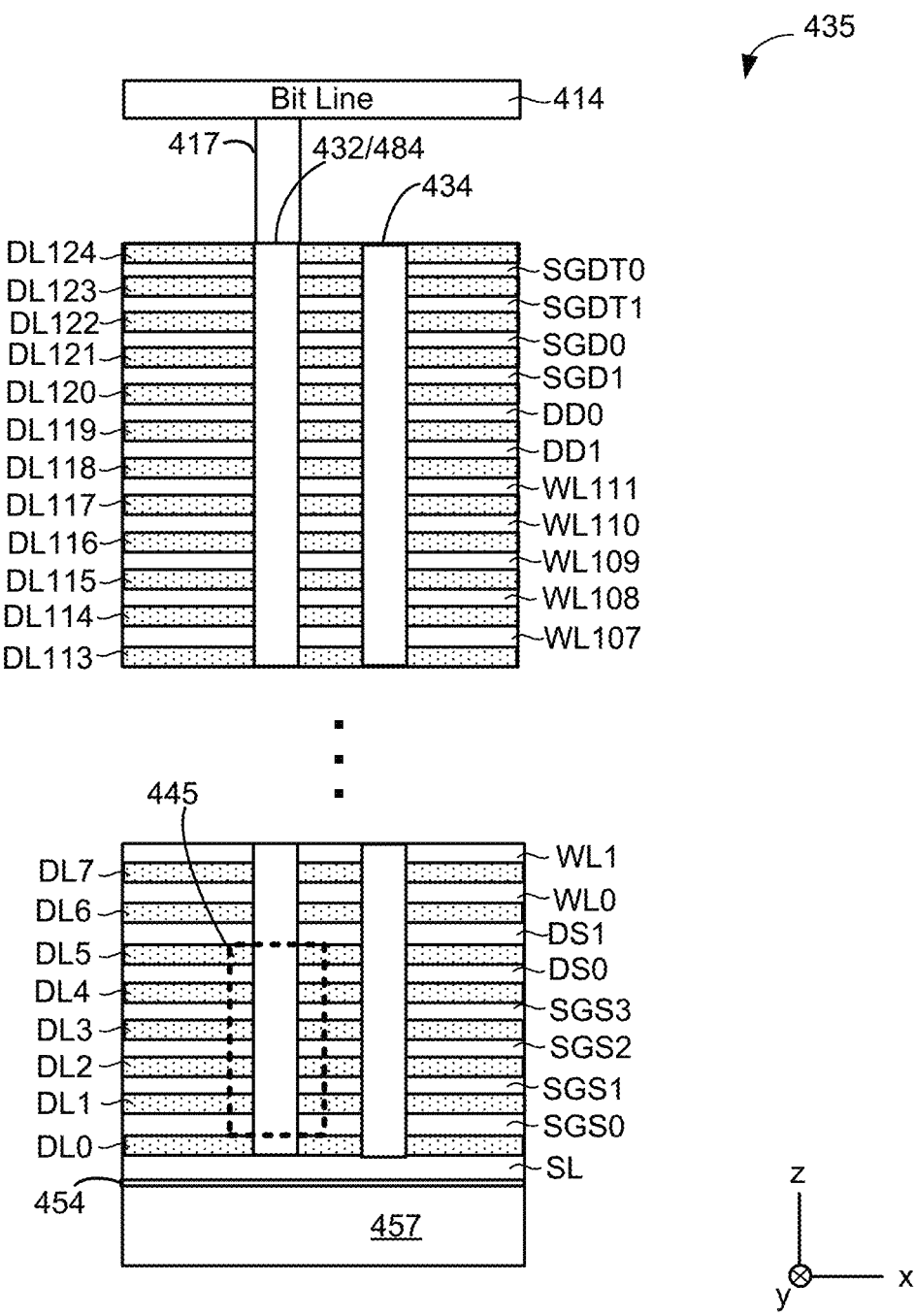
FIG. 4C depicts an example of a stack showing a cross-sectional view along line AA of FIG. 4B1.

FIG. 4C depicts an example of a stack 435 showing a cross-sectional view along line AA of FIG. 4B. The SGD layers include SGDT0, SGDT1, SGD0, and SGD1. The SGD layers may have more or fewer than four layers. The SGS layers includes SGS0, SGS1, SGS2, and SGS3. The SGS layers may have more or fewer than four layers. Four dummy word line layers DD0, DD1, DS1, and DS0 are provided, in addition to the data word line layers WL0-WL111. There may be more or fewer than 112 data word line layers and more or fewer than four dummy word line layers. Each NAND string has a drain side select gate at the SGD layers. Each NAND string has a source side select gate at the SGS layers. Also depicted are dielectric layers DL0-DL124.

Columns 432, 434 of memory cells are depicted in the multi-layer stack. The stack includes a substrate 457, an insulating film 454 on the substrate, and a portion of a source line SL. A portion of the bit line 414 is also depicted. Note that NAND string 484 is connected to the bit line 414. NAND string 484 has a source-end at a bottom of the stack and a drain-end at a top of the stack. The source-end is connected to the source line SL. A conductive via 417 connects the drain-end of NAND string 484 to the bit line 414.

In one embodiment, the memory cells are arranged in NAND strings. The word line layers WL0-WL111 connect to memory cells (also called data memory cells). Dummy word line layers DD0, DD1, DS0 and DS1 connect to dummy memory cells. A dummy memory cell does not store and is not eligible to store host data (data provided from the host, such as data from a user of the host), while a data memory cell is eligible to store host data. In some embodiments, data memory cells and dummy memory cells may have a same structure. Drain side select layers SGD are used to electrically connect and disconnect (or cut off) the channels of respective NAND strings from bit lines. Source side select layers SGS are used to electrically connect and disconnect (or cut off) the channels of respective NAND strings from the source line SL.

Figure 4D:
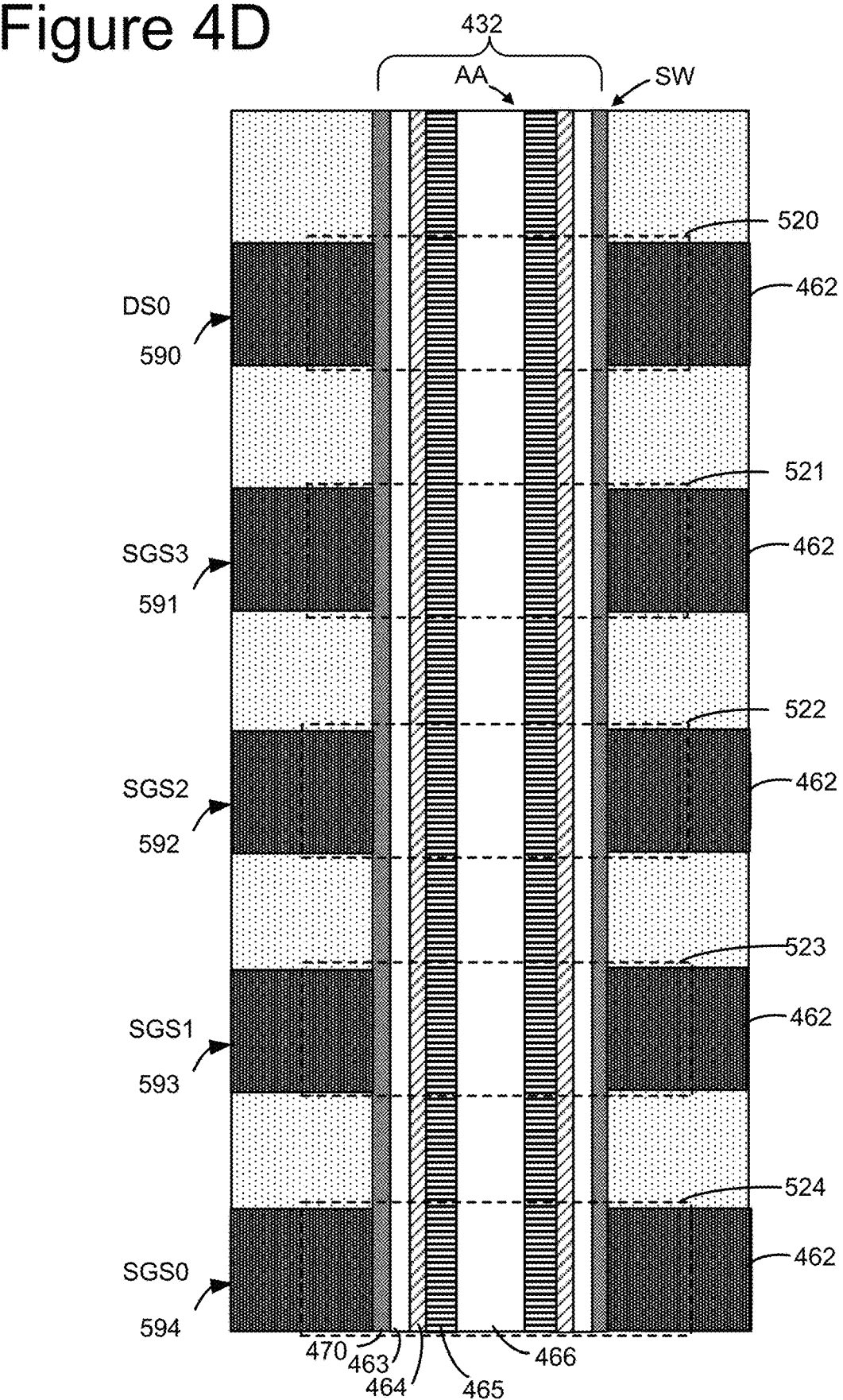
FIG. 4D depicts a view of the region 445 of FIG. 4C.

FIG. 4D depicts a view of the region 445 of FIG. 4C. A dummy memory cell transistor 520 and four SGS transistors 521, 522, 523, and 524 are indicated by the dashed lines. A number of layers can be deposited along the sidewall (SW) of the memory hole 432 and/or within each word line layer, e.g., using atomic layer deposition. For example, each column (e.g., the pillar which is formed by the materials within a memory hole) can include a blocking oxide/block high-k material 470, charge-trapping layer or film 463 such as SiN or other nitride, a tunneling layer 464, a polysilicon body or channel 465, and a dielectric core 466. A word line layer can include a conductive metal 462 such as Tungsten as a control gate. For example, control gates 590, 591, 592, 593 and 594 are provided. In this example, all of the layers except the metal are provided in the memory hole. In other approaches, some of the layers can be in the control gate layer. Additional pillars are similarly formed in the different memory holes. A pillar can form a columnar active area (AA) of a NAND string.

Data memory cells are not depicted in FIG. 4D, but may have a similar structure as the dummy memory cell and the SGS transistors. When a data memory cell transistor is programmed, electrons are stored in a portion of the charge-trapping layer which is associated with the data memory cell transistor. These electrons are drawn into the charge-trapping layer from the channel, and through the tunneling layer. The Vt of a data memory cell transistor is increased in proportion to the amount of stored charge. During an erase operation, the electrons return to the channel. The dummy memory cell 520 and the SGS transistors 521, 522, 523, and 524 may also be programmed in a manner similar to programming the data memory cells.

Each of the memory holes can be filled with a plurality of annular layers (also referred to as memory film layers) comprising a blocking oxide layer, a charge trapping layer, a tunneling layer and a channel layer. A core region of each of the memory holes is filled with a body material, and the plurality of annular layers are between the core region and the WLLs in each of the memory holes. In some cases, the tunneling layer 464 can comprise multiple layers such as in an oxide-nitride-oxide configuration.

FIG. 4E1 is a schematic diagram of a portion of the memory array 202. FIG. 4E1 shows physical data word lines WL0-WL111 running across the entire block. The structure of FIG. 4E1 corresponds to a portion 407 in Block 2 of FIG. 4A, including bit line 411. FIG. 4E1 is consistent with the example in FIG. 4B1 in which there are five electrically separate SGD select lines. Within the physical block, in one embodiment, each bit line is connected to five NAND strings. Thus, FIG. 4E1 shows bit line 411 connected to NAND string NS0, NAND string NS1, NAND string NS2, NAND string NS3, and NAND string NS4.

In one embodiment, there are five sets of drain side select lines in the physical block. In one embodiment, each set of drain side select lines has four lines, each at a different layer of the stack. For example, the set of drain side select lines connected to NS0 include SGDT0-s0, SGDT1-s0, SGD0-s0, and SGD1-s0. The set of drain side select lines connected to NS1 include SGDT0-s1, SGDT1-s1, SGD0-s1, and SGD1-s1. The set of drain side select lines connected to NS2 include SGDT0-s2, SGDT1-s2, SGD0-s2, and SGD1-s2. The set of drain side select lines connected to NS3 include SGDT0-s3, SGDT1-s3, SGD0-s3, and SGD1-s3. The set of drain side select lines connected to NS4 include SGDT0-s4, SGDT1-s4, SGD0-s4, and SGD1-s4. Herein the term "SGD" may be used as a general term to refer to any one or more of the lines in a set of drain side select lines. In an embodiment, each line in a given set may be operated independent from the other lines in that set to allow for different voltages to the gates of the four drain side select transistors on the NAND string. Moreover, each set of drain side select lines can be selected independent of the other sets. Each set of drain side select lines connects to a group of NAND strings in the block. Only one NAND string of each group is depicted in FIG. 4E1. These five sets of drain side select lines correspond to five sub-blocks. A first sub-block corresponds to those vertical NAND strings controlled by SGDT0-s0, SGDT1-s0, SGD0-s0, and SGD1-s0. A second sub-block corresponds to those vertical NAND strings controlled by SGDT0-s1, SGDT1-s1, SGD0-s1, and SGD1-s1. A third sub-block corresponds to those vertical NAND strings controlled by SGDT0-s2, SGDT1-s2, SGD0-s2, and SGD1-s2. A fourth sub-block corresponds to those vertical NAND strings controlled by SGDT0-s3, SGDT1-s3, SGD0-s3, and SGD1-s3. A fifth sub-block corresponds to those vertical NAND strings controlled by SGDT0-s4, SGDT1-s4, SGD0-s4, and SGD1-s4. As noted, FIG. 4E1 only shows the NAND strings connected to bit line 411. However, a full schematic of the block would show every bit line and five vertical NAND strings connected to each bit line.

Note that in FIG. 4E1 each SGS select line (SGS0, SGS1, SGS2, SGS3, SGS4) connects to the control gate of each NAND string (NS0, NS1, NS2, NS3, NS4). This corresponds to an architecture in which an SGS select line extends across the entire x-y plane of a block, similar to the word line layers. For example, the example of FIG. 4B3 may be used for a layer in which the SGS select line extends across the entire x-y plane of a block. Referring again to FIG. 4E1, the Vt of the select transistors connected to the SGS lines may be programmed to either a high Vt or a low Vt to enable sub-block selection. The SGS select transistors on each NAND string (NS0, NS1, NS2, NS3, NS4) may have a different high/low Vt pattern to enable sub-block selection, as will be explained in more detail below.

FIG. 4E2 is a schematic diagram of a portion of the memory array 202 in accordance with a variation of FIG. 4E1 in which there are six NAND strings connected to each bit line. FIG. 4E2 is consistent with the example in FIG. 4C2 in which there are six electrically separate SGD select lines. Within the physical block, in one embodiment, each bit line is connected to six NAND strings. Thus, FIG. 4E2 shows bit line 411 connected to NAND string NS0, NAND string NS1, NAND string NS2, NAND string NS3, NAND string NS4, and NAND string NS5.

In one embodiment, there are six sets of drain side select lines in the physical block. In addition to those discussed in the example of FIG. 4E2, there is the set of drain side select lines connected to NS5, which includes SGDT0-$s$5, SGDT1-$s$5, SGD0-$s$05 and SGD1-$s$5. Only one NAND string of each group is depicted in FIG. 4E2. These six sets of drain side select lines correspond to six sub-blocks. The sixth sub-block corresponds to those vertical NAND strings controlled by SGDT0-$s$5, SGDT1-$s$5, SGD0-$s$5, and SGD1-$s$5.

Note that in FIG. 4E2 each SGS select line (SGS0, SGS1, SGS2, SGS3) connects to each NAND string (NS0, NS1, NS2, NS3, NS4, NS5). This corresponds to an architecture in which an SGS select line extends across the entire x-y plane of a block, similar to the word line layers. The Vt of the select transistors connected to the SGS lines may be programmed to either a high Vt or a low Vt to enable sub-block selection. The SGS select transistors on each NAND string (NS0, NS1, NS2, NS3, NS4, NS5) may have a different high/low Vt pattern to enable sub-block selection, as will be explained in more detail below.

FIG. 4E3 is a schematic diagram of a portion of the memory array 202 in accordance with still another variation in which the SGG layers connect to each NAND string (NS0, NS1, NS2, NS3, NS4, NS5). FIG. 4E3 is consistent with the example in FIG. 4B3 in which there is a single contiguous SGD select line in a layer. Within the physical block, in one embodiment, each bit line is connected to six NAND strings. Thus, FIG. 4E3 shows bit line 411 connected to NAND string NS0, NAND string NS1, NAND string NS2, NAND string NS3, NAND string NS4, and NAND string NS5. In one embodiment, the drain side select line at each respective layer extends in the x-y direction across the entire physical block. Only one NAND string of each group is depicted in FIG. 4E3. The Vt of the select transistors connected to the SGD lines may be programmed to either a high Vt or a low Vt to enable sub-block selection. The SGD select transistors on each NAND string (NS0, NS1, NS2, NS3, NS4, NS5) may have a different high/low Vt pattern to enable sub-block selection, as will be explained in more detail below.

Note that in FIG. 4E3 each SGS select line (SGS0, SGS1, SGS2, SGS3) connects to each NAND string (NS0, NS1, NS2, NS3, NS4, NS5). This corresponds to an architecture in which an SGS select line extends across the entire x-y plane of a block, similar to the word line layers. The Vt of the select transistors connected to the SGS lines may be programmed to either a high Vt or a low Vt to enable sub-block selection. The SGS select transistors on each NAND string (NS0, NS1, NS2, NS3, NS4, NS5) may have a different high/low Vt pattern to enable sub-block selection, as will be explained in more detail below.

Note that in the architecture of FIGS. 4E1, 4E2, and 4E3 there is a potential for excess current consumption during sub-block operations. For example, if all of the SGS lines have a select voltage applied thereto, then it is possible for the SGS transistors of every NAND string in the block to turn on, if the Vt of the SGS transistors is below the select voltage. Thus, the SGS transistors on NAND strings in unselected blocks could turn on. Note that the electrically separate SGD lines in an architecture in FIGS. 4E1 and 4E2 can be used to select the sub-blocks. However, the there may be some excess current consumption resulting from the turning on of the SGS transistors in unselected sub-blocks. However, embodiments of a memory system establish the Vt of the SGS transistors in different high/low Vt patterns for each sub-block to keep off the SGS transistors in unselected sub-blocks thereby reducing current consumption during sub-block operations. One example sub-block operation in current is reduced is a read operation; however, current may be reduced in other sub-block operations. Current consumption may be especially high when the word line voltages are ramped up. Therefore, embodiments of a memory system may have significant current reduction when the word line voltages are ramped up during a read operation. However, current may be reduced at other portions of a read operation as well.

Although the example memories of FIGS. 4-4E3 are three dimensional memory structure that includes vertical NAND strings with charge-trapping material, other 3D memory structures can also be used with the technology described herein.

Figure 5A:
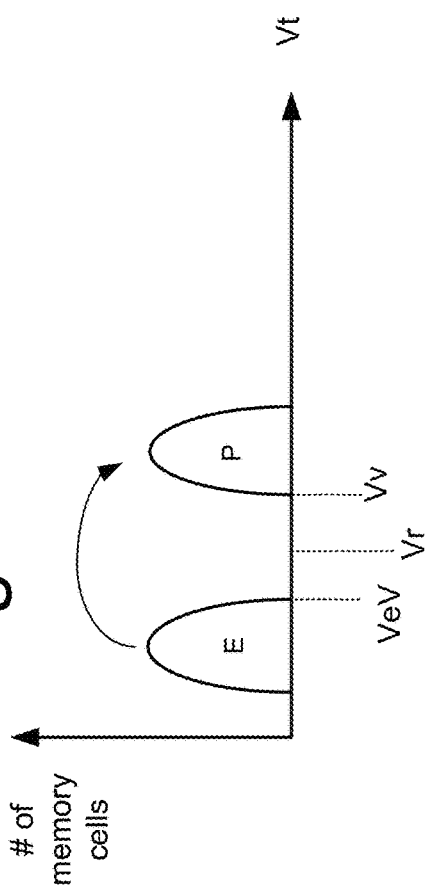
FIG. 5A depicts a threshold voltage (Vt) distributions when each memory cells stores one bit.

The storage systems discussed above can be erased, programmed and read. At the end of a successful programming process, the threshold voltages of the memory cells should be within one or more distributions of threshold voltages for programmed memory cells or within a distribution of threshold voltages for erased memory cells, as appropriate. FIG. 5A is a graph of threshold voltage versus number of memory cells, and illustrates example threshold voltage distributions for the memory array when each memory cell stores one bit of data per memory cell. Memory cells that store one bit of data per memory cell data are referred to as single level cells ("SLC"). The data stored in SLC memory cells is referred to as SLC data; therefore, SLC data comprises one bit per memory cell. Data stored as one bit per memory cell is SLC data. Memory cells that store multiple bits per memory cell data are referred to as multi-level cells ("MLC"). The data stored in MLC memory cells is referred to as MLC data; therefore, MLC data comprises multiple bits per memory cell. Data stored as multiple bits of data per memory cell is MLC data. FIG. 5A shows two threshold voltage distributions: E and P. Threshold voltage distribution E corresponds to an erased data state. Threshold voltage distribution P corresponds to a programmed data state. Memory cells that have threshold voltages in threshold voltage distribution E are, therefore, in the erased data state (e.g., they are erased). Memory cells that have threshold voltages in threshold voltage distribution P are, therefore, in the programmed data state (e.g., they are programmed). In one embodiment, erased memory cells store data "1" and programmed memory cells store data "0." FIG. 5A depicts read reference voltage Vr. By testing (e.g., performing one or more sense operations) whether the threshold voltage of a given memory cell is above or below Vr, the system can determine whether a memory cell is erased (state E) or programmed (state P). FIG. 5A also depicts a verify reference voltage Vv. In some embodiments, when programming memory cells to data state P, the system will test whether those memory cells have a threshold voltage greater than or equal to Vv. In some embodiments, when programming memory cells to data state P, the system will not perform a verify operation. For example, the memory system may apply a single program pulse without verification.

Memory cells that store multiple bit per memory cell data are referred to as multi-level cells ("MLC"). The data stored in MLC memory cells is referred to as MLC data; therefore, MLC data comprises multiple bits per memory cell. Data stored as multiple bits of data per memory cell is MLC data. In the example embodiment of FIG. 5B, each memory cell stores three bits of data. Other embodiments may use other data capacities per memory cell (e.g., such as two, four, or five bits of data per memory cell).

Figure 5B:
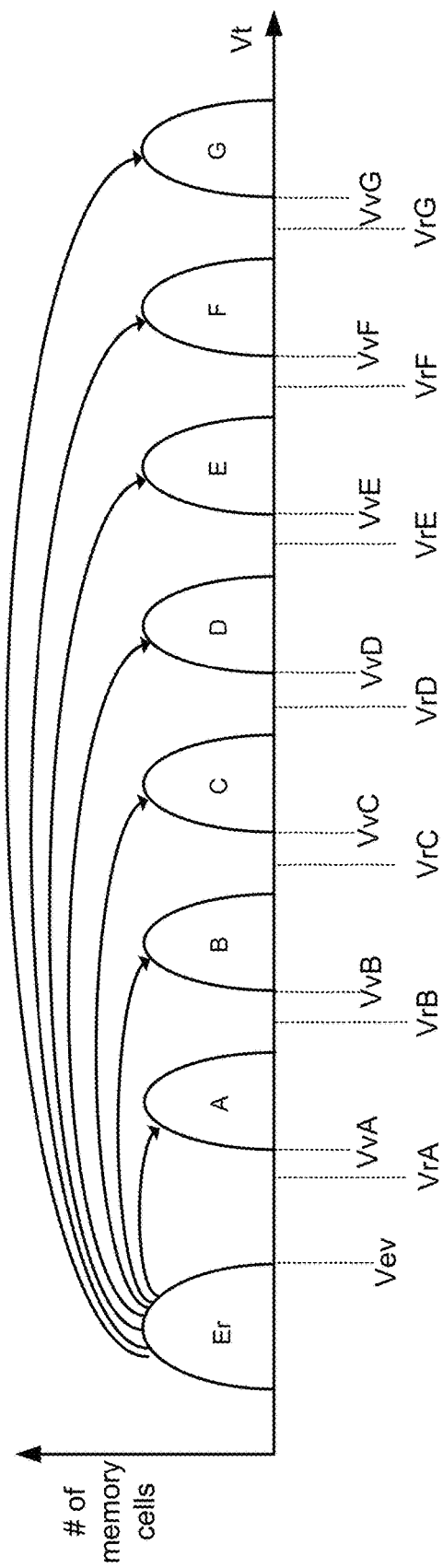
FIG. 5B depicts a threshold voltage (Vt) distributions when each memory cells stores three bits.

FIG. 5B shows eight threshold voltage distributions, corresponding to eight data states. The first threshold voltage distribution (data state) Er represents memory cells that are erased. The other seven threshold voltage distributions (data states) A-G represent memory cells that are programmed and, therefore, are also called programmed states. Each threshold voltage distribution (data state) corresponds to predetermined values for the set of data bits. The specific relationship between the data programmed into the memory cell and the threshold voltage levels of the cell depends upon the data encoding scheme adopted for the cells. In one embodiment, data values are assigned to the threshold voltage ranges using a Gray code assignment so that if the threshold voltage of a memory erroneously shifts to its neighboring physical state, only one bit will be affected. In an embodiment, the number of memory cells in each state is about the same.

FIG. 5B shows seven read reference voltages, VrA, VrB, VrC, VrD, VrE, VrF, and VrG for reading data from memory cells. By testing (e.g., performing sense operations) whether the threshold voltage of a given memory cell is above or below the seven read reference voltages, the system can determine what data state (i.e., A, B, C, D, . . . ) a memory cell is in. FIG. 5B also shows a number of verify reference voltages. The verify reference voltages are VvA, VvB, VvC, VvD, VvE, VVF, and VvG. In one embodiment, the verify reference voltages VvA, VvB, VvC, VvD, VvE, VvF, and VvG are used when verifying memory cells. For example, when programming memory cells to data state A, the system will test whether those memory cells have a threshold voltage greater than or equal to VvA. If the memory cell has a threshold voltage greater than or equal to VvA, then the memory cell is locked out from further programming. Similar reasoning applies to the other data states.

Similar to how memory cell transistors may be programmed to a target Vt, a non-data cell transistor on a NAND string may also be programmed to a target Vt. FIG. 6 is a graph of threshold voltage versus number of non-data cell transistors, and illustrates example threshold voltage distributions for non-data cell transistors. In this example, there are two threshold voltage distributions referred to as low Vt and high Vt. A number of techniques may be used to establish these two threshold voltage distributions. One technique is to first erase all of the non-data cell transistors of interest to an erase distribution such as in the example of the SLC cells in FIG. 5A. The erase distribution may serve as the low Vt distribution. Then, some of the non-data cell transistors may be programmed to the high Vt distribution, such as in the example of the SLC cells in the P state FIG. 5A. However, other techniques could be used. For example, with respect to the example distributions in FIG. 5B, the low Vt distribution could be achieved by programming a first set of the non-data cell transistors to a distribution similar to one of the programmed distributions (e.g., A, B, C, etc.). The high Vt distribution could be achieved by programming a second set of the non-data cell transistors to a distribution similar to a higher one of the programmed distributions (e.g., D, E, F etc.).

Figures 7A, 7B:
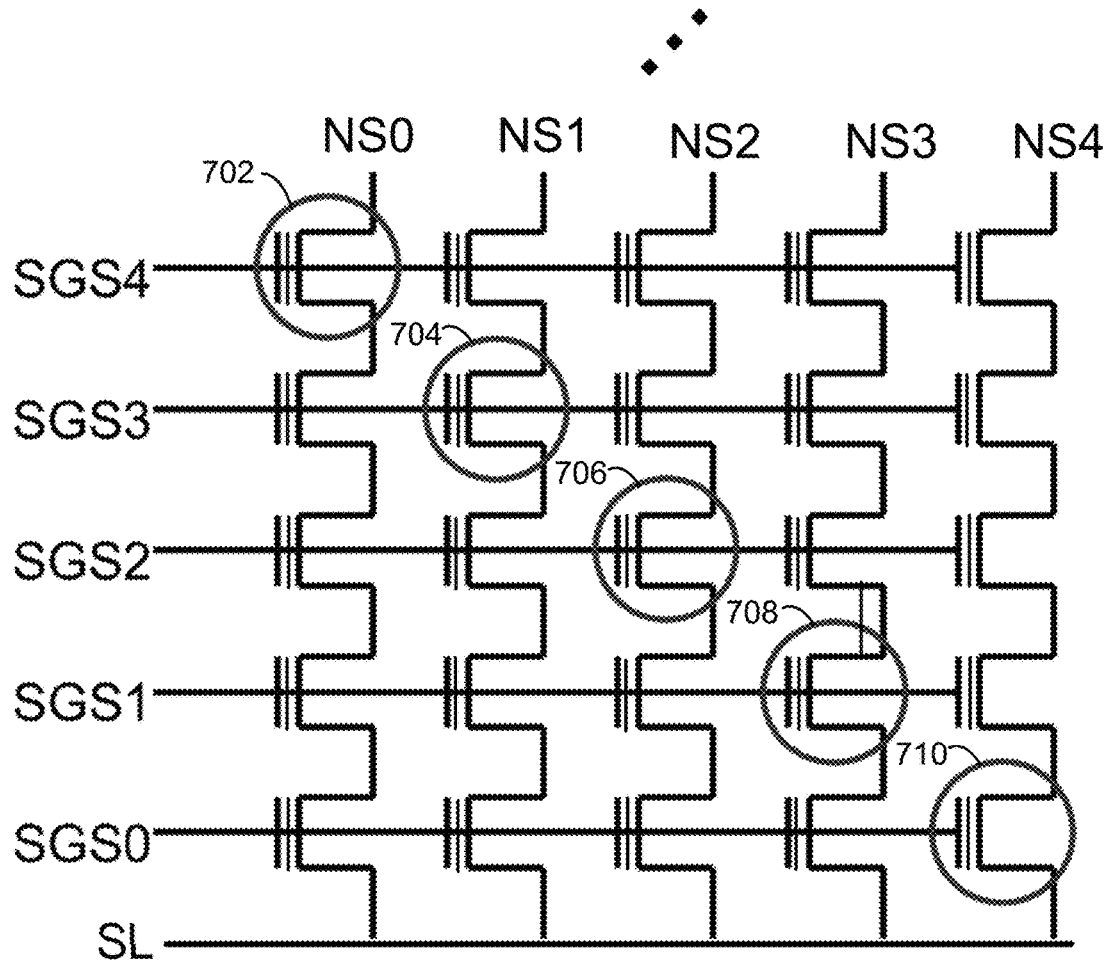
FIG. 7A depicts a pattern of high Vt and low Vt transistors that may be used to select sub-blocks.
FIG. 7B is a table that depicts voltages that may be used to select each respective sub-block in the example of FIG. 7A.

FIG. 7A depicts a pattern of high Vt and low Vt transistors that may be used to select sub-blocks. Five NAND strings (NS0, NS1, NS2, NS3, NS4) and five SGS lines (SGS0, SGS1, SGS2, SGS3, SGS4) are depicted. This is similar to the example in FIG. 4E1. Only the SGS portion of the NAND strings is depicted in FIG. 7A. Each of the five NAND strings represents one of the NAND strings in a sub-block. Thus, FIG. 7A is a five sub-block (SB0, SB1, SB2, SB3, SB4) example. Although the SGD lines are not depicted in FIG. 7A, in an embodiment the SGD lines are electrically separated as in the examples in FIGS. 4B1 and 4E1. However, in another embodiment, the SGD line in one layer is a contiguous region as in the examples in FIGS. 4B3 and 4E3. Each NAND string in FIG. 7A has one high Vt SGS transistor and four low Vt SGS transistors. For NS0 transistor 702 is high Vt, with the other four transistors having a low Vt. For NS1 transistor 704 is high Vt, with the other four transistors having a low Vt. For NS2 transistor 706 is high Vt, with the other four transistors having a low Vt. For NS3 transistor 708 is high Vt, with the other four transistors having a low Vt. For NS4 transistor 710 is high Vt, with the other four transistors having a low Vt. The pattern of high/low Vt SGS transistors is different for each NAND string in FIG. 7A to enable sub-block selection.

FIG. 7B is a table 750 that depicts voltages that may be used to select each respective sub-block in the example of FIG. 7A. Equation 1 describes the relative magnitudes for the voltages in table 750 and the transistors' Vts.

$$\text{low } Vt < \text{SGS\_USEL} < \text{high } Vt < \text{SGS\_SEL} \qquad \text{Eq. 1}$$

Therefore, to select SB0 (having NS0) SGS_SEL applied to SGS4 will turn on the high Vt transistor 702. Also, SGS_USEL applied to SGS0, SGS1, SGS2, and SGS3 will turn on the low Vt transistors on NS0. Therefore, NS0 will have its channel connected to the source line (SL). Similar reasoning applies to the other NAND strings in SB0 (these other NAND strings are not depicted in FIG. 7A). Therefore, sub-block SB0 will be selected. However, SGS_USEL applied to SGS0, SGS1, SGS2, and SGS3 will keep off the high Vt transistors 704, 706, 708 and 710 on NS1, NS2, NS3, NS4, respectively. Therefore, each of NS1, NS2, NS3, NS4 will have their respective channels cut off from the source line (SL). Similar reasoning applies to the other NAND strings in SB1, SB2, SB3, and SB4 (these other NAND strings are not depicted in FIG. 7A). Therefore, sub-blocks SB1, SB1, SB3, and SB4 will not be selected. Table 750 also indicates how the other sub-blocks may be selected in a similar manner just described for selecting SB0.

Figures 8A, 8B:
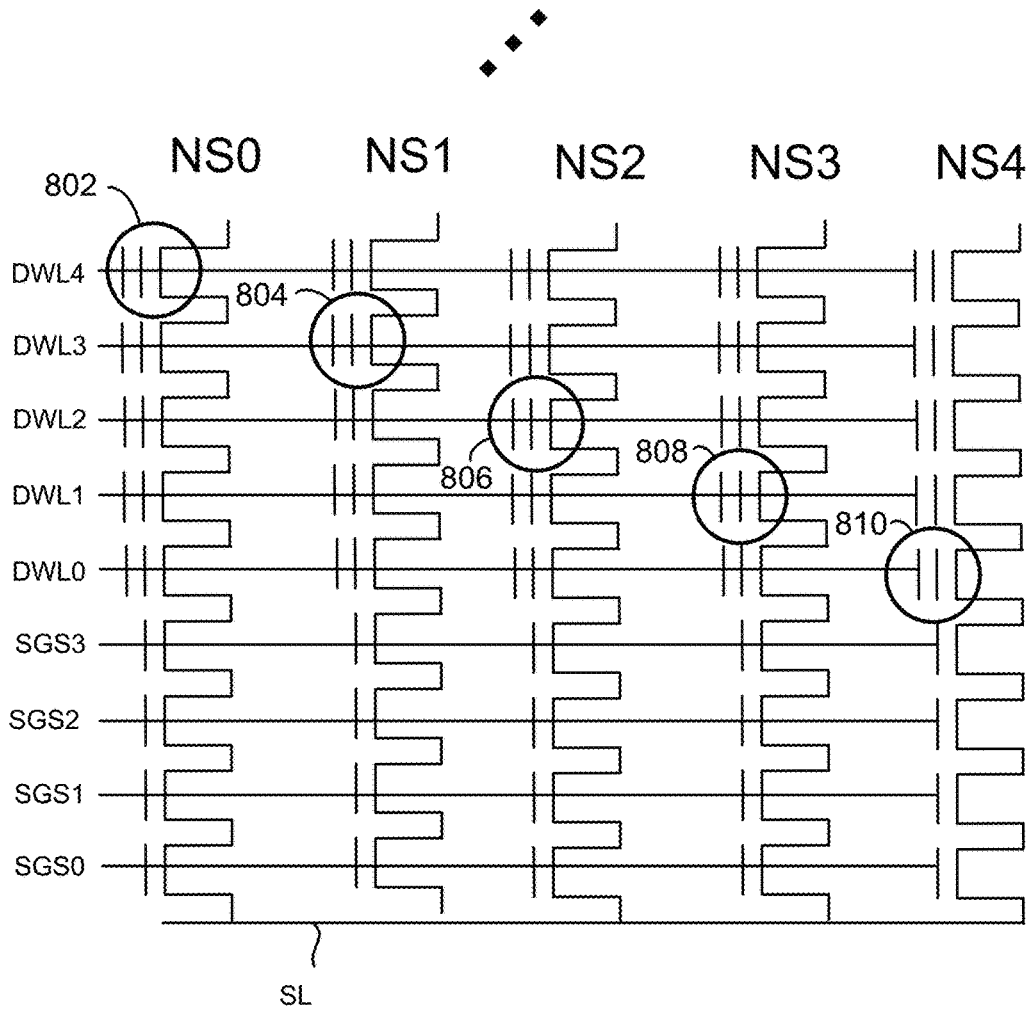
FIG. 8A depicts a pattern of high Vt and low Vt transistors that may be used to select sub-blocks in which the transistors are what may be referred to herein as dummy cell transistors.
FIG. 8B is a table that depicts voltages that may be used to select each respective sub-block in the example of FIG. 8A.

The ability to select between NAND strings (or sub-blocks) based on different low/high Vt patterns for the different NAND strings (or sub-blocks) may be applied to lines other than a set of lines that are immediately adjacent to the source line (or bit lines). FIG. 8A depicts a pattern of high Vt and low Vt transistors that may be used to select sub-blocks in which the transistors are what may be referred to herein as dummy memory cell transistors. Only a lower portion of the NAND strings is depicted in FIG. 8A. Each of the five NAND strings represents one of the NAND strings in a sub-block. Thus, FIG. 8A is a five sub-block (SB0, SB1, SB2, SB3, SB4) example. Five NAND strings (NS0, NS1, NS2, NS3, NS4), four SGS lines (SGS0, SGS1, SGS2, SGS3) and five dummy word lines (DWL0, DWL1, DWL2, DWL3, DWL4) are depicted. This configuration may be achieved with a slight reconfiguration in word line usage relative to the example of FIG. 4E2. FIG. 4E2 shows the four SGS lines (SGS0, SGS1, SGS2, and SGS3). Two dummy word lines (DS1, DS2) are renamed DWL0, DWL1 in FIG. 8A. Data word lines WL0, WL1 and WL2 in FIG. 4E2 are used as dummy word lines (DWL2, DWL3, DWL4) in the embodiment of FIG. 8A. In an embodiment, the architecture of FIG. 4E2 may be used in two modes. In a first mode WL0, WL1 and WL2 are used to store data and hence are referred to as data word lines. In the second mode WL0, WL1 and WL2 are used as dummy word lines (DWL2, DWL3, DWL4) and hence memory cells connected to DWL2, DWL3, DWL4 are not used to store data.

The five dummy word lines (DWL0, DWL1, DWL2, DWL3, DWL4) in FIG. 8A may be operated in a similar manner to the five SGS lines (SGS0, SGS1, SGS2, SGS3, SGS4) in FIG. 7A. For the sake of discission the transistors in FIG. 8A that are connected to a dummy word line will be referred to as a "dummy" transistor. Each NAND string in FIG. 8A has one high Vt dummy transistor connected to one of the dummy word lines and four low Vt dummy transistors connected to the other dummy word lines. For NS0 transistor 802 is high Vt, with the other four "dummy" transistors (connected to DWL0, DWL1, DWL2, and DWL3) having a low Vt. For NS1 dummy transistor 804 is high Vt, with the other four dummy transistors having a low Vt. For NS2 dummy transistor 806 is high Vt, with the other four dummy transistors having a low Vt. For NS3 dummy transistor 808 is high Vt, with the other four dummy transistors having a low Vt. For NS4 dummy transistor 810 is high Vt, with the other four dummy transistors having a low Vt. The pattern of high/low Vt dummy transistors is different for each NAND string in FIG. 8A to enable sub-block selection.

FIG. 8B is a table 850 that depicts voltages that may be used to select each respective sub-block in the example of FIG. 8A. Equation 2 describes the relative magnitudes for the voltages in table 850 and the dummy transistors Vts.

$$\text{low dummy } Vt < \text{DWL\_USEL} < \text{high dummy } Vt < \text{DWL\_SEL} \quad \text{Eq. 2}$$

Therefore, to select SB0 (having NS0) DWL_SEL applied to DWL4 will turn on the high Vt transistor 802. Also, DWL_USEL applied to DWL0, DWL1, DWL2, and DWL3 will turn on the low Vt transistors on NS0. Moreover, SGS0, SGS1, SGS2, and SGS3 may have voltages applied thereto to turn on the SGS transistors on NS0. Therefore, NS0 will have its channel connected to the source line (SL). Similar reasoning applies to the other NAND strings in SB0 (these other NAND strings are not depicted in FIG. 8A). Therefore, sub-block SB0 will be selected. However, DWL_USEL applied to DWL0, DWL1, DWL2, and DWL3 will keep off the high Vt transistors 804, 806, 808 and 810 on NS1, NS2, NS3, NS4, respectively. Therefore, each of NS1, NS2, NS3, NS4 will have their respective channels cut off from the source line (SL). Similar reasoning applies to the other NAND strings in SB1, SB2, SB3, and SB4 (these other NAND strings are not depicted in FIG. 8A). Therefore, sub-blocks SB1, SB1, SB3, and SB4 will not be selected. Table 850 also indicates how the other sub-blocks may be selected in a similar manner just described for selecting SB0.

In some embodiments the number of select lines equals the number of sub-blocks. For example, in FIG. 7A, there are five SGS lines and five sub-blocks. In FIG. 8A, there are five dummy lines (used as selection lines) and five sub-blocks. In each of these examples there may be more or fewer than five sub-blocks, with an appropriate change to the number of select lines. In some embodiments, there are fewer select lines than sub-blocks, which has the advantage of needing fewer select lines.

Figures 9A, 9B:
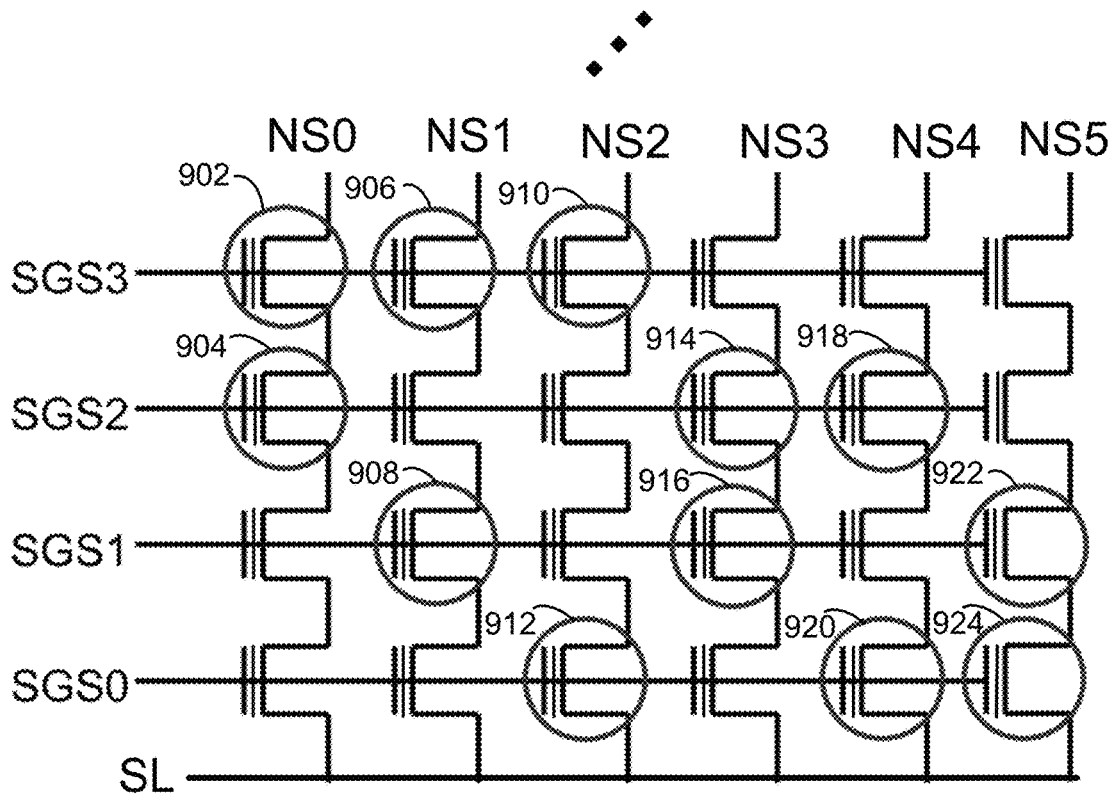
FIG. 9A depicts a pattern of high Vt and low Vt transistors that may be used to select more sub-blocks that there are select lines.
FIG. 9B is a table that depicts voltages that may be used to select each respective sub-block in the example of FIG. 9A.

FIG. 9A depicts a pattern of high Vt and low Vt transistors that may be used to select more sub-blocks than there are select lines. Six NAND strings (NS0, NS1, NS2, NS3, NS4, NS5) and four SGS lines (SGS0, SGS1, SGS2, SGS3) are depicted. This is similar to the examples in FIGS. 4B2, 4B3, 4E2 and 4E3. Only the SGS portion of the NAND strings is depicted in FIG. 9A. Each of the six NAND strings represents one of the NAND strings in a sub-block. Thus, FIG. 9A is a six sub-block (SB0, SB1, SB2, SB3, SB4, SB5) example. Although the SGD lines are not depicted in FIG. 9A, in an embodiment the SGD lines are electrically separated as in the examples in FIGS. 4B2 and 4E2. However, in another embodiment, the SGD line is one layer is contiguous line in the examples in FIGS. 4B3 and 4E3. Each NAND string in FIG. 9A has two high Vt SGS transistors and two low Vt SGS transistors at the source end of the NAND strings. For NS0, transistors 902 and 904 are high Vt, with the other two transistors having a low Vt. For NS1, transistors 906 and 908 are high Vt, with the other two transistors having a low Vt. For NS2, transistors 910 and 912 are high Vt, with the other two transistors having a low Vt. For NS3, transistors 914 and 916 are high Vt, with the other two transistors having a low Vt. For NS4, transistors 918 and 920 are high Vt, with the other two transistors having a low Vt. For NS5, transistors 922 and 924 are high Vt, with the other two transistors having a low Vt. The pattern of high/low Vt SGS transistors is different for each NAND string in FIG. 9A to enable sub-block selection.

FIG. 9B is a table 950 that depicts voltages that may be used to select each respective sub-block in the example of FIG. 9A. The relative magnitudes for the voltages in Equation 1 may be used for the SGS lines. Therefore, to select SB0 (having NS0) SGS_SEL is applied to SGS2 and SGS3 to turn on the high Vt transistors 902, 904. Also, SGS_USEL applied to SGS0 and SGS1 will turn on the low Vt transistors on NS0. Therefore, NS0 will have its channel connected to the source line (SL). Similar reasoning applies to the other NAND strings in SB0 (these other NAND strings are not depicted in FIG. 9A). Therefore, sub-block SB0 will be selected. However, SGS_USEL applied to SGS0 and SGS1 will keep off: high Vt transistor 908 on NS1, high Vt transistor 912 on NS2, high Vt transistor 916 on NS3, high Vt transistor 920 on NS4, and high Vt transistors 922, 924 on NS5. Therefore, each of NS1, NS2, NS3, NS4 and NS5 will have their respective channels cut off from the source line (SL). Similar reasoning applies to the other NAND strings in SB1, SB2, SB3, SB4, and SB5 (these other NAND strings are not depicted in FIG. 9A). Therefore, sub-blocks SB1, SB1, SB3, SB4, SB5 will not be selected. Table 950 also indicates how the other sub-blocks may be selected in a similar manner just described for selecting SB0.

Figures 10A, 10B:
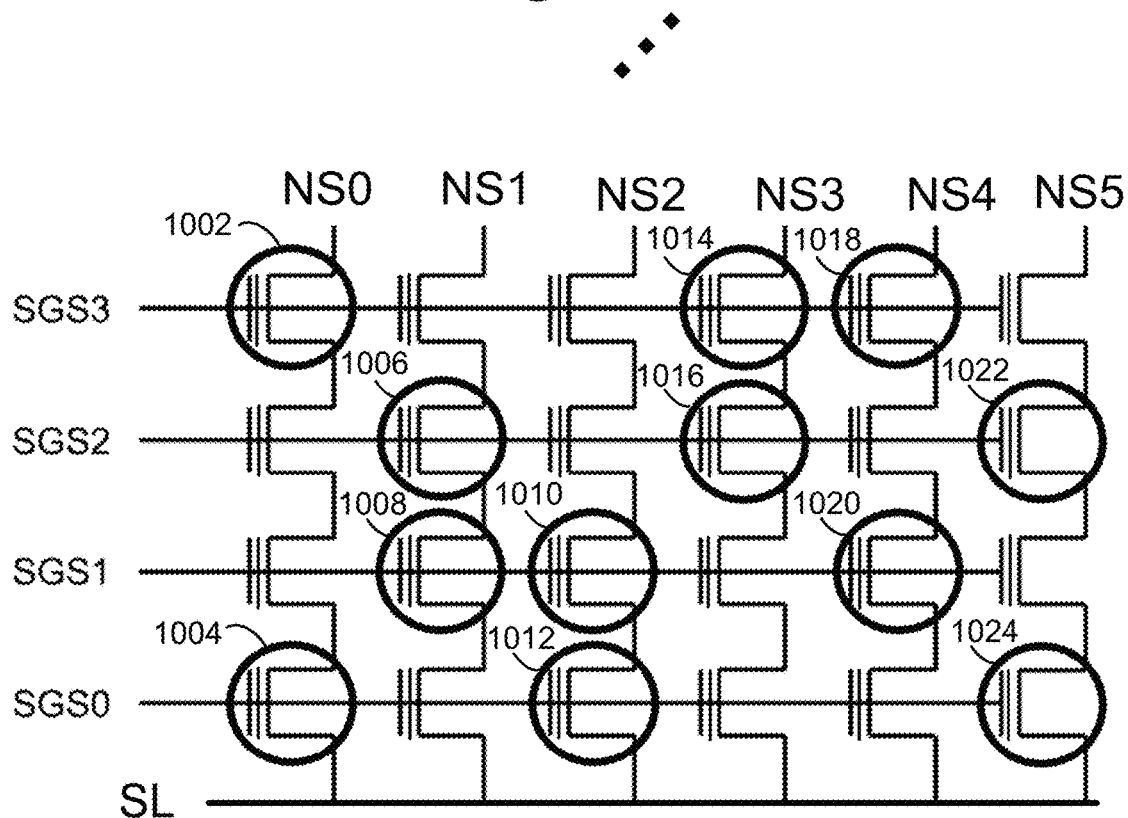
FIG. 10A is another example pattern of high/low Vt for the source side select transistors.
FIG. 10B is a table that depicts voltages that may be used to select each respective sub-block in the example of FIG. 10A.

The low/high Vt example in FIG. 9A is just one example pattern. Many other patterns may be used. FIG. 10A is another example pattern of high/low Vt for the source side select transistors. Six NAND strings (NS0, NS1, NS2, NS3, NS4, NS5) and four SGS lines (SGS0, SGS1, SGS2, SGS3) are depicted. This is similar to the example in FIGS. 4B2, 4B3, 4E2, and 4E3. Only the SGS portion of the NAND strings is depicted in FIG. 9A. Each of the six NAND strings represents one of the NAND strings in a sub-block. Thus, FIG. 10A is a six sub-block (SB0, SB1, SB2, SB3, SB4, SB5) example. Although the SGD lines are not depicted in FIG. 10A, in an embodiment the SGD lines are electrically separated as in the examples in FIGS. 4B2 and 4E2. However, in another embodiment, the SGD line is one layer is contiguous line in the examples in FIGS. 4B3 and 4E3. Each NAND string in FIG. 10A has two high Vt SGS transistors and two low Vt SGS transistors at the source end of the NAND strings. For NS0, transistors 1002 and 1004 are high Vt, with the other two transistors having a low Vt. For NS1, transistors 1006 and 1008 are high Vt, with the other two transistors having a low Vt. For NS2, transistors 1010 and 1012 are high Vt, with the other two transistors having a low Vt. For NS3, transistors 1014 and 1016 are high Vt, with the other two transistors having a low Vt. For NS4, transistors 1018 and 1020 are high Vt, with the other two transistors having a low Vt. For NS5, transistors 1022 and 1024 are high Vt, with the other two transistors having a low Vt. The pattern of high/low Vt SGS transistors is different for each NAND string in FIG. 10A to enable sub-block selection.

FIG. 10B is a table 1050 that depicts voltages that may be used to select each respective sub-block in the example of FIG. 10A. The relative magnitudes for the voltages in Equation 1 may be used for the SGS lines. Therefore, to select SB0 (having NS0) SGS_SEL is applied to SGS0 and SGS3 to turn on the high Vt transistors 1002, 1004. Also, SGS_USEL applied to SGS1 and SGS2 will turn on the low Vt transistors on NS0. Therefore, NS0 will have its channel connected to the source line (SL). Similar reasoning applies to the other NAND strings in SB0 (these other NAND strings are not depicted in FIG. 10A). Therefore, sub-block SB0 will be selected. However, SGS_USEL applied to SGS1 and SGS2 will keep off: high Vt transistors 1006, 1008 on NS1, high Vt transistor 1010 on NS2, high Vt transistor 1016 on NS3, high Vt transistor 1020 on NS4, and high Vt transistor 1022 on NS5. Therefore, each of NS1, NS2, NS3, NS4 and NS5 will have their respective channels cut off from the source line (SL). Similar reasoning applies to the other NAND strings in SB1, SB2, SB3, SB4, and SB5 (these other NAND strings are not depicted in FIG. 10A). Therefore, sub-blocks SB1, SB1, SB3, SB4, SB5 will not be selected. Table 1050 also indicates how the other sub-blocks may be selected in a similar manner just described for selecting SB0.

Figures 11A, 11B:
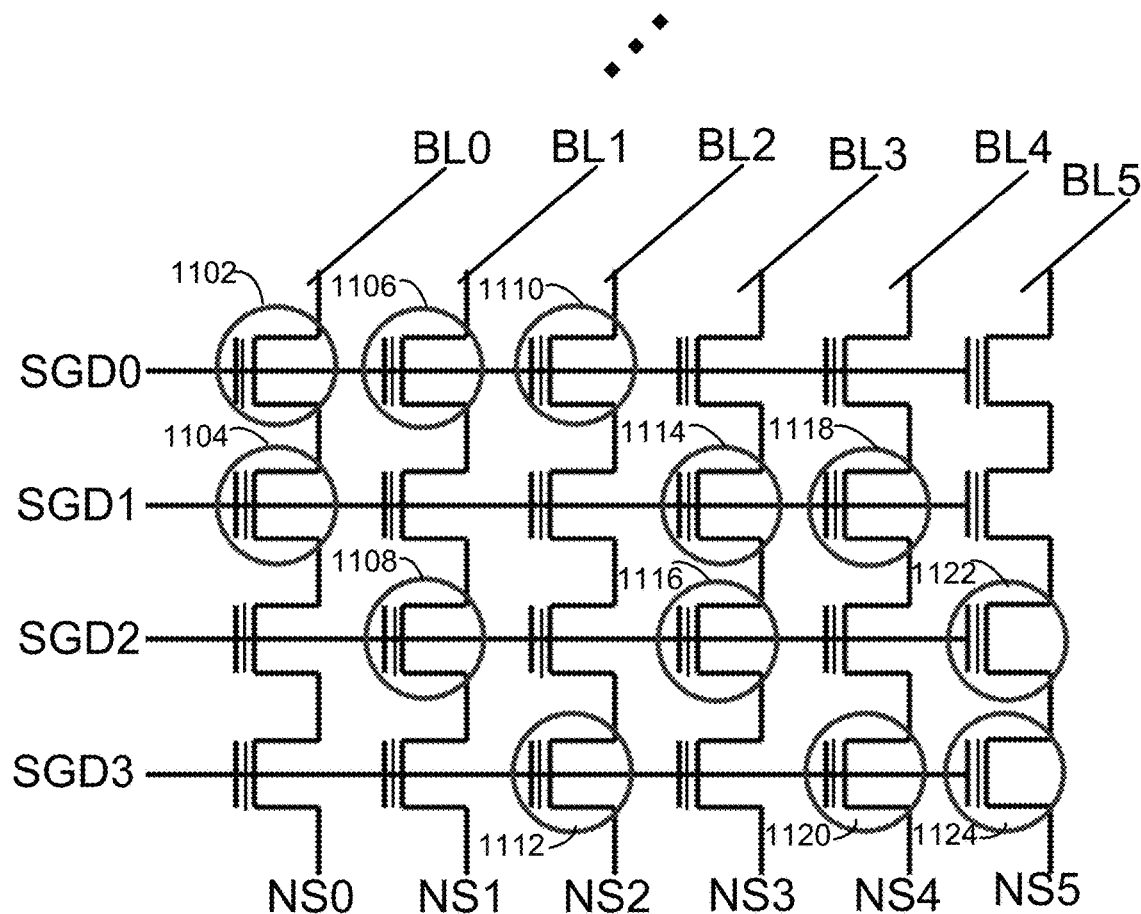
FIG. 11A depicts a pattern of high Vt and low Vt transistors that may be used to select sub-blocks from the bit line side of the NAND strings.
FIG. 11B is a table that depicts voltages that may be used to select each respective sub-block in the example of FIG. 11A.

In some embodiments a pattern of high Vt and low Vt transistors is used to select sub-blocks from a bit line end (drain end) of the NAND strings. FIG. 11A depicts a pattern of high Vt and low Vt transistors that may be used to select sub-blocks from the bit line side of the NAND strings. Six NAND strings (NS0, NS1, NS2, NS3, NS4, NS5) and four SGD lines (SGD0, SGD1, SGD2, SGD3) are depicted. This is similar to the example in FIGS. 4B3 and 4E3. Only the SGD portion of the NAND strings is depicted in FIG. 11A. Each of the six NAND strings represents one of the NAND strings in a sub-block. Thus, FIG. 11A is a six sub-block (SB0, SB1, SB2, SB3, SB4, SB5) example. Each NAND string in FIG. 11A has two high Vt SGS transistors and two low Vt SGS transistors at the source end of the NAND strings. For NS0, transistors 1102 and 1104 are high Vt, with the other two transistors having a low Vt. For NS1, transistors 1106 and 1108 are high Vt, with the other two transistors having a low Vt. For NS2, transistors 1110 and 1112 are high Vt, with the other two transistors having a low Vt. For NS3, transistors 1114 and 1116 are high Vt, with the other two transistors having a low Vt. For NS4, transistors 1118 and 1120 are high Vt, with the other two transistors having a low Vt. For NS5, transistors 1122 and 1124 are high Vt, with the other two transistors having a low Vt. The pattern of high/low Vt SGD transistors is different for each NAND string in FIG. 11A to enable sub-block selection from the bit line side.

FIG. 11B is a table 1150 that depicts voltages that may be used to select each respective sub-block in the example of FIG. 11A. Equation 3 describes the relative magnitudes for the voltages in table 1150 and the transistors Vts.

$$\text{low } Vt < \text{SGD\_USEL} < \text{high } Vt < \text{SGD\_SEL} \qquad \text{Eq. 3}$$

Therefore, to select SB0 (having NS0) SGD_SEL is applied to SGD0 and SGD1 to turn on the high Vt transistors 1102, 1104. Also, SGD_USEL applied to SGD2 and SGD3 will turn on the low Vt transistors on NS0. Therefore, NS0 will have its channel connected to the bit line (BL0). Similar reasoning applies to the other NAND strings in SB0 (these other NAND strings are not depicted in FIG. 11A). Therefore, sub-block SB0 will be selected. However, SGD_USEL applied to SGD2 and SGD3 will keep off: high Vt transistor 1108 on NS1, high Vt transistor 1112 on NS2, high Vt transistor 1116 on NS3, high Vt transistor 1120 on NS4, and high Vt transistors 1122, 1124 on NS5. Therefore, each of NS1, NS2, NS3, NS4 and NS5 will have their respective channels cut off from the respective bit line (BL1, BL2, BL3, BL4, BL5). Similar reasoning applies to the other NAND strings in SB1, SB2, SB3, SB4, and SB5 (these other NAND strings are not depicted in FIG. 11A). Therefore, sub-blocks SB1, SB1, SB3, SB4, SB5 will not be selected. Table 1150 also indicates how the other sub-blocks may be selected in a similar manner just described for selecting SB0.

Figure 12:
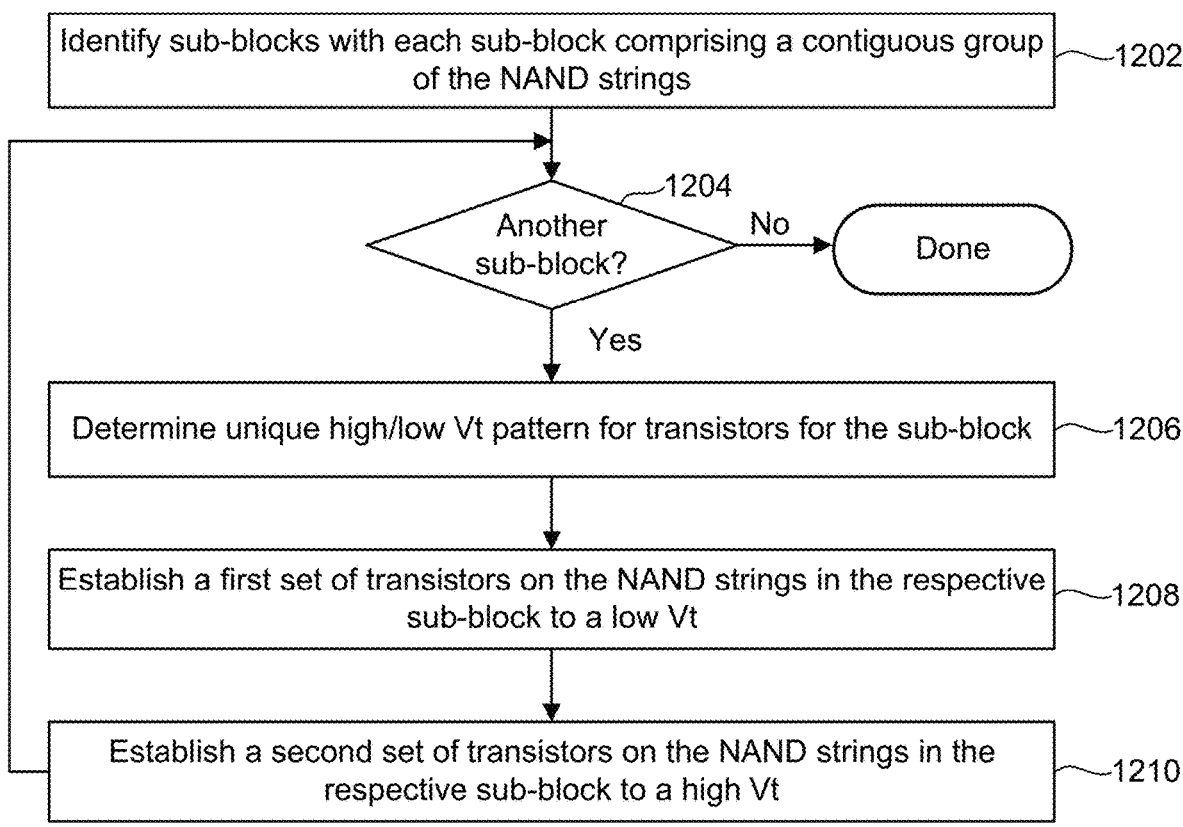
FIG. 12 is a flowchart of one embodiment of a process of establishing low/high Vt patterns in select transistors for enabling sub-block selection.

FIG. 12 is a flowchart of one embodiment of a process 1200 of establishing low/high Vt patterns in non-data cell transistors for enabling sub-block selection. Process 1200 may be used to establish Vt patterns including, but not limited to, examples in FIGS. 7A, 8A, 9A, 10A, and/or 11A. The steps are described in a certain order as a matter of convenience, but may be performed in a different order. Step 1202 includes identifying sub-blocks with each sub-block comprising a contiguous group of NAND strings. Step 1204 includes a determination of whether programming Vts for all sub-blocks has been completed. Step 1206 is to determine a unique high/low Vt pattern for non-data cell transistors in the sub-block. Note that the term non-data cell transistors may applied to the transistors connected to the SGS lines, the SGS lines, or the dummy word lines. Step 1208 includes establishing a first set of non-data cell transistors in the NAND strings in the sub-block to a low Vt. Step 1210 includes establishing a second set of non-data cell transistors in the NAND strings in the sub-block to a high Vt. Next, another determination is made if there are more sub-blocks to process. If not, the process ends. Otherwise, a different high/low Vt pattern is programmed into the non-data cell transistors next sub-block. Steps 1208 and 1210 may be performed a number of different ways. One technique is to first erase all non-data cell transistors to establish the low Vt, which could be done for the entire block. Erasing the non-data cell transistors may include applying an erase pulse that lowers Vt and then an erase verification that verifies that the Vt is below target Vt. Then, the sub-blocks may be programmed one at a time to establish the high Vt. Programming the non-data cell transistors may include applying a program pulse that increases Vt and then a program verification that verifies that the Vt is above target Vt. Another technique is to use programming to establish the low Vt as well as the high Vt.

Figure 13:
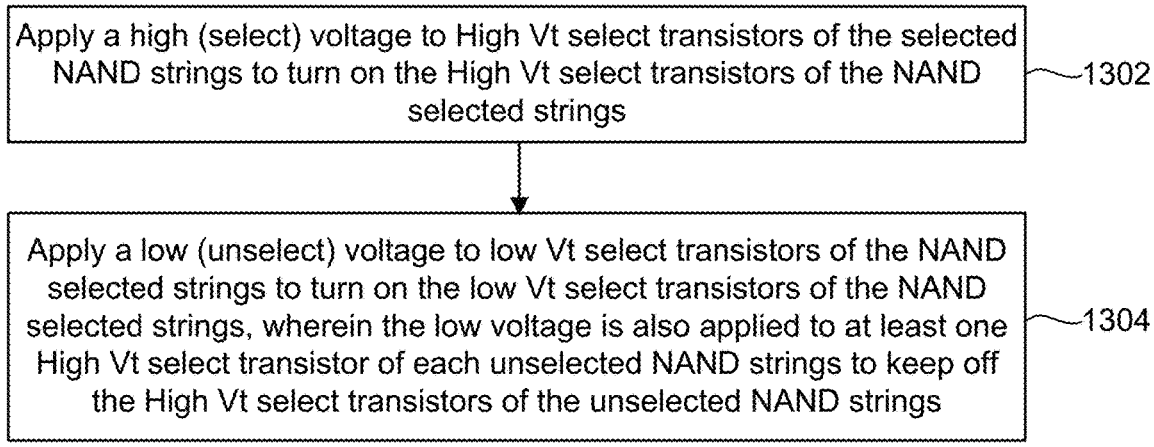
FIG. 13 is a flowchart of one embodiment of a process of operating select transistors to select NAND strings.

FIG. 13 is a flowchart of one embodiment of a process 1300 of operating non-data cell transistors to select NAND strings. The term non-data cell transistors may apply to the transistors connected to the SGS lines, the SGS lines, and/or the dummy word lines. The process 1300 may be used to select a sub-block. Step 1302 includes applying a high (e.g., select) voltage to high Vt non-data cell transistors of the selected NAND strings to turn on the high Vt non-data cell transistors of the selected NAND strings. Note that step 1302 may include applying the high (select) voltage to a first set of one or more conductive lines. This first set of one or more conductive lines may be connected to the high Vt non-data cell transistors of the selected NAND strings. This first set of one or more conductive lines may also be connected to non-data cell transistors (high Vt or low Vt) of unselected NAND strings in the block.

Step 1304 includes applying a low (unselect) voltage to low Vt non-data cell transistors on the selected NAND strings to turn on the low Vt non-data cell transistors of the selected NAND strings. The low (unselect) voltage is also applied to at least one high Vt non-data cell transistor of each unselected NAND string in the block to keep off the high Vt non-data cell transistors of the unselected NAND strings. Note that step 1304 may include applying the low (unselect) voltage to a second set of one or more conductive lines. The second set of one or more conductive lines may be connected to the low Vt non-data cell transistors of the selected NAND strings and also to the aforementioned at least one high Vt non-data cell transistor of each unselected NAND string in the block.

FIG. 14 is a flowchart of one embodiment of a process 1400 of operating selecting a sub-block based on a voltage pattern. Step 1402 includes applying a first pattern of voltages to a set of conductive lines connected to select a first sub-block comprising a first set of NAND strings in a block. Each conductive line in the set connected to a control gate of a transistor of each NAND string in the block. In an embodiment, the set of conductive lines comprises source side select lines. In an embodiment, the set of conductive lines comprises drain side select lines. In an embodiment, the set of conductive lines comprises dummy word lines connected to dummy memory cells. Example patterns for the voltages include, but are not limited to, table 750, 850, 950, 1010, and 1150. In each of these tables, the column for each sub-block has a different voltage pattern. In an embodiment, the voltage pattern corresponds to the high/low Vt pattern of the transistors in the corresponding sub-blocks. In an embodiment, steps 1302 and 1304 in FIG. 13 are performed in step 1402. Step 1404 includes applying a second pattern of voltages to the set of conductive lines to select a second sub-block comprising a second set of NAND strings in the block. In an embodiment, steps 1302 and 1304 in FIG. 13 are performed again in step 1404, but with a different voltage pattern.

In view of the foregoing, an embodiment includes an apparatus comprising one or more control circuits configured to connect to a memory structure comprising a plurality of blocks. Each block comprises: a plurality of NAND strings having transistors in series. The transistors include memory cell transistors and non-data cell transistors. Each block has a plurality of word lines each connected to a memory cell transistor on each NAND string in the block. Each block has a plurality of conductive lines each connected to a non-data cell transistor on each NAND string in the block. The plurality of NAND strings in each block having first ends connected to bit lines and second ends connected to one or more source lines. The one or more control circuits are configured to apply a first voltage to a first set of the conductive lines in a selected block. Each conductive line in the first set connected to a high threshold voltage (Vt) non-data cell transistor on each respective selected NAND string in the selected block to turn on the high Vt non-data cell transistors of the selected NAND strings. The one or more control circuits are configured to apply a second voltage to a second set of the conductive lines in the selected block. Each conductive line in the second set connected to a low Vt non-data cell transistor on each respective selected NAND string to turn on the low Vt non-data cell transistors of the selected NAND strings. Each conductive line in the second set is connected to at least one high Vt non-data cell transistor of each unselected NAND string in the selected block to keep off the high Vt non-data cell transistors of the unselected NAND strings. The Vt of the high Vt non-data cell transistor is higher than the Vt of the low Vt non-data cell transistors. The first voltage is greater than the second voltage.

In a further embodiment, the plurality of conductive lines are source side select lines immediately adjacent to the one or more source lines. Turning on the non-data cell transistors of the selected NAND strings connects channels of the selected NAND strings to the one or more source lines. Keeping off the non-data cell transistors of the unselected NAND strings disconnects channels of the unselected NAND strings from the one or more source lines.

In a further embodiment, the plurality of conductive lines are dummy word lines. The selected block further comprises one or more source side select lines between the dummy word lines and the one or more source lines. Turning on the non-data cell transistors of the selected NAND strings connects channels of the selected NAND strings to the one or more source lines. Turning off the non-data cell transistors of the unselected NAND strings disconnects channels of the unselected NAND strings from the one or more source lines.

In a further embodiment, the plurality of conductive lines are drain side select lines immediately adjacent to the bit lines. Turning on the non-data cell transistors of the selected NAND strings connects channels of the selected NAND strings to the bit lines. Turning off the non-data cell transistors of the unselected NAND strings disconnects channels of the unselected NAND strings from the bit lines.

In a further embodiment, the one or more control circuits are further configured to identify a plurality of sub-blocks in the selected block with each sub-block comprising a contiguous group of the NAND strings in the block. For each respective sub-block in the selected block: establish a first set of the non-data cell transistors on the NAND strings in the respective sub-block to the high Vt. Establish a second set of the non-data cell transistors on the NAND strings in the respective sub-block to the low Vt. Each sub-block has a different pattern of high Vt and low Vt non-data cell transistors on each NAND string to enable separate selection of the respective sub-blocks.

In a further embodiment, the one or more control circuits are further configured to identify n sub-blocks in the selected block with each sub-block comprising a contiguous group of the NAND strings in the selected block. For each respective sub-block in the selected block: establish one of the non-data cell transistors on each NAND string in the respective sub-block to the high Vt; and establish n-1 of the non-data cell transistors on each NAND in the respective sub-block to the low Vt. Each sub-block has a different pattern of high Vt and low Vt non-data cell transistors on each NAND string to enable separate selection of the respective sub-blocks.

In a further embodiment, the one or more control circuits are further configured to the identify m sub-blocks in the selected block with each sub-block comprising a contiguous group of the NAND strings in the selected block. For each respective sub-block in the selected block: establish a first set of the non-data cell transistors on the NAND strings in the respective sub-block to the high Vt; and establish a second set of the non-data cell transistors on the NAND strings in the respective sub-block to the low Vt, wherein each sub-block has a different pattern of high Vt and low Vt non-data cell transistors on each NAND string to enable separate selection of the respective sub-blocks, wherein the first set of the conductive lines and the second set of the conductive lines total less than m.

In a further embodiment, the one or more control circuits are further configured to read selected memory cells on the selected NAND strings while the high Vt and the low Vt non-data cell transistors of the selected NAND strings are on and the high Vt non-data cell transistors of the unselected NAND strings are off.

In a further embodiment, the selected NAND strings are a first set of NAND string in a first sub-block in a block. The first voltage applied to the first set of the conductive lines and the second voltage applied to the second set of the conductive lines are a first pattern. The one or more control circuits are further configured to apply a second pattern of voltages to the first set and the second set of conductive lines to select a second sub-block in the selected block comprising a second set of NAND strings.

One embodiment includes a method for operating NAND memory. The method comprises applying a first pattern of high and low voltages to a set of conductive lines in a block to select a first sub-block comprising a first set of NAND strings in the block. Each conductive line in the set connected to a control gate of a non-data cell transistor of each NAND string in the block. The first pattern of high and low voltages comprises the high voltage to a first one or more conductive lines in the set and the low voltage to remaining conductive lines in the set. The high voltage has a higher magnitude than the low voltage. The non-data cell transistors are not eligible to store data. The method comprises applying a second pattern of high and low voltages to the set of conductive lines to select a second sub-block comprising a second set of NAND strings in the block. The high voltage has a higher magnitude than the low voltage. The second pattern of high and low voltages comprises the high voltage to a second one or more conductive lines in the set and the low voltage to remaining conductive lines in the set.

One embodiment includes a non-volatile storage system, comprising a plurality of blocks each comprising: a plurality of NAND strings having transistors in series, a plurality of data word lines with each data word line connected to a transistor on each NAND string in the block, a plurality of conductive lines each connected to a non-data cell transistor on each NAND string in the block. The plurality of NAND strings in each block having first ends connected to bit lines and second ends connected to one or more source lines. The non-volatile storage system has one or more control circuits in communication with the plurality of blocks. The one or more control circuits are configured to identify a plurality of sub-blocks in a block with each sub-block comprising a contiguous group of the NAND strings in the block. For each respective sub-block in the block: establish a first set of non-data cell transistors on the NAND strings in the respective sub-block to a high threshold voltage (Vt). Establish a second set of non-data cell transistors on the NAND strings in the respective sub-block to a low Vt that is lower than the high Vt. Each sub-block in the block has a different pattern of high Vt and low Vt non-data cell transistors to enable separate selection of the respective sub-blocks. The first set of non-data cell transistors are connected to a first set of the plurality of conductive lines. The second set of non-data cell transistors are connected to a second set of the plurality of conductive lines.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via one or more intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus comprising:
one or more control circuits configured to connect to a memory structure comprising a plurality of blocks, each block comprising: a plurality of NAND strings having transistors in series, the transistors including memory cell transistors and non-data cell transistors, each block having a plurality of word lines each connected to a memory cell transistor on each NAND string in the block, each block having a plurality of conductive lines each conductive line connected to a non-data cell transistor on each NAND string in the block, the plurality of NAND strings in each block having first ends connected to bit lines and second ends connected to one or more source lines, the one or more control circuits configured to:
apply a first voltage to a first set of the conductive lines in a selected block, each conductive line in the first set connected to a high threshold voltage (Vt) non-data cell transistor on each respective selected NAND string in a selected sub-block in the selected block to turn on the high Vt non-data cell transistors of the selected NAND strings in the selected sub-block; and
apply a second voltage to a second set of the conductive lines in the selected block, each conductive line in the second set connected to a low Vt non-data cell transistor on each respective selected NAND string in the selected sub-block to turn on the low Vt non-data cell transistors of the selected NAND strings in the selected sub-block, wherein each conductive line in the second set is connected to at least one high Vt non-data cell transistor of each unselected NAND string in unselected sub-blocks in the selected block to keep off the high Vt non-data cell transistors of the unselected NAND strings in the unselected sub-blocks, wherein the Vt of the high Vt non-data cell transistor is higher than the Vt of the low Vt non-data cell transistors, wherein the first voltage is greater than the second voltage, wherein turning on both the high Vt non-data cell transistors and the low Vt non-data cell transistors on the selected NAND strings in the selected sub-block connects channels of the selected NAND strings to either selected bit lines or the one or more source lines, wherein keeping off the high Vt non-data cell transistors of the unselected NAND strings in the unselected sub-blocks disconnects the channels of the unselected NAND strings from either the bit lines or the one or more source lines.

2. The apparatus of claim 1, wherein;
the plurality of conductive lines are source side select lines immediately adjacent to the one or more source lines;
turning on both the high Vt and the low Vt non-data cell transistors of the selected NAND strings in the selected sub-block connects the channels of the selected NAND strings to the one or more source lines; and
keeping off the high Vt non-data cell transistors of the unselected NAND strings in the unselected sub-blocks disconnects the channels of the unselected NAND strings from the one or more source lines.

3. The apparatus of claim 1, wherein:
the plurality of conductive lines are dummy word lines;
the selected block further comprises one or more source side select lines between the dummy word lines and the one or more source lines;
turning on both the high Vt and the low Vt non-data cell transistors of the selected NAND strings connects channels of the selected NAND strings to the one or more source lines; and
turning off the high Vt non-data cell transistors of the unselected NAND strings disconnects channels of the unselected NAND strings from the one or more source lines.

4. The apparatus of claim 1, wherein:
the plurality of conductive lines are drain side select lines immediately adjacent to the bit lines;
turning on both the high Vt and the low Vt non-data cell transistors of the selected NAND strings connects channels of the selected NAND strings to the bit lines; and
turning off the high Vt non-data cell transistors of the unselected NAND strings disconnects channels of the unselected NAND strings from the bit lines.

5. The apparatus of claim 1, wherein the one or more control circuits are further configured to:
identify a plurality of sub-blocks in the selected block with each sub-block comprising a contiguous group of the NAND strings in the selected block;
for each respective sub-block in the selected block:
establish a first set of the non-data cell transistors on the NAND strings in the respective sub-block to the high Vt; and
establish a second set of the non-data cell transistors on the NAND strings in the respective sub-block to the low Vt, wherein each sub-block has a different pattern of high Vt and low Vt non-data cell transistors on each NAND string to enable separate selection of the respective sub-blocks.

6. The apparatus of claim 1, wherein the one or more control circuits are further configured to:
identify n sub-blocks in the selected block with each sub-block comprising a contiguous group of the NAND strings in the selected block, wherein n is equal to a total number of the first set of the conductive lines and the second set of the conductive lines in the selected block;
for each respective sub-block in the selected block:
establish one of the non-data cell transistors on each NAND string in the respective sub-block to the high Vt; and
establish n−1 of the non-data cell transistors on each NAND string in the respective sub-block to the low Vt, wherein each sub-block has a different pattern of high Vt and low Vt non-data cell transistors on each NAND string to enable separate selection of the respective sub-blocks.

7. The apparatus of claim 1, wherein the one or more control circuits are further configured to:
identify m sub-blocks in the selected block with each sub-block comprising a contiguous group of the NAND strings in the selected block, wherein m is greater than a total number of the first set of the conductive lines and the second set of the conductive lines in the selected block;
for each respective sub-block in the selected block:
establish a first set of the non-data cell transistors on the NAND strings in the respective sub-block to the high Vt; and
establish a second set of the non-data cell transistors on the NAND strings in the respective sub-block to the low Vt, wherein each sub-block has a different pattern of high Vt and low Vt non-data cell transistors on each NAND string to enable separate selection of the respective sub-blocks.

8. The apparatus of claim 1, wherein the one or more control circuits are further configured to:
read selected memory cells on the selected NAND strings while the high Vt and the low Vt non-data cell transistors of the selected NAND strings are on and the high Vt non-data cell transistors of the unselected NAND strings are off.

9. The apparatus of claim 1, wherein:
the selected NAND strings are a first set of NAND string in a first sub-block in a block;
the first voltage applied to the first set of the conductive lines and the second voltage applied to the second set of the conductive lines are a first pattern; and
the one or more control circuits are further configured to apply a second pattern of voltages to the first set and the second set of conductive lines to select a second sub-block in the selected block comprising a second set of NAND strings.

10. A method for operating NAND memory, the method comprising:
applying a first pattern of high and low voltages to a set of conductive lines in a block to select a first sub-block comprising a first set of NAND strings in the block, each conductive line in the set connected to a control gate of a non-data cell transistor of each NAND string in the block, the first pattern of high and low voltages comprises the high voltage to a first one or more conductive lines in the set and the low voltage to remaining conductive lines in the set, the high voltage has a higher magnitude than the low voltage, the non-data cell transistors are not eligible to store data, including turning on both one or more high Vt non-data cell transistors and one or more low Vt non-data cell transistors of selected NAND strings in the first sub-block to select the first sub-block while keeping off at least one high Vt non-data cell transistor on all NAND strings in all sub-blocks in the block other than the first sub-block to unselect all the other sub-blocks in the block than the first sub-block; and applying a second pattern of high and low voltages to the set of conductive lines to select a second sub-block comprising a second set of NAND strings in the block, the second pattern of high and low voltages comprises the high voltage to a second one or more conductive lines in the set and the low voltage to remaining conductive lines in the set, including turning on both one or more high Vt non-data cell transistors and one or more low Vt non-data cell transistors of selected NAND strings in the second sub-block to select the second sub-block while keeping off at least one high Vt non-data cell transistor on all NAND strings in all sub-blocks in the block other than the second sub-block to unselect all the other sub-blocks in the block other than the second sub-block.

11. The method of claim 10, wherein the set of conductive lines comprises source side select lines.

12. The method of claim 10, wherein the set of conductive lines comprises drain side select lines.

13. The method of claim 10, wherein the set of conductive lines comprises dummy word lines connected to dummy memory cells.

14. The method of claim 10, wherein applying the first pattern of high and low voltages to the set of conductive lines connected to select the first sub-block comprises:
applying a first voltage to a first group of conductive lines in the set to turn on high Vt non-data cell transistors of selected NAND strings in the first sub-block of the selected NAND strings; and
applying a second voltage to a second group of conductive lines in the set to turn on low Vt non-data cell transistors of the selected NAND strings and to keep off high Vt non-data cell transistors of unselected NAND strings in the block.

15. A non-volatile storage system, comprising:
a plurality of blocks each comprising: a plurality of NAND strings having transistors in series, a plurality of data word lines with each data word line connected to a transistor on each NAND string in the block, a plurality of conductive lines each connected to a non-data cell transistor on each NAND string in the block, the plurality of NAND strings in each block having first ends connected to bit lines and second ends connected to one or more source lines; and
one or more control circuits in communication with the plurality of blocks, the one or more control circuits configured to:
identify a plurality of sub-blocks in a selected block with each sub-block comprising a contiguous group of the NAND strings in the selected block;
for each respective sub-block in the selected block:
establish a first set of non-data cell transistors on the NAND strings in the respective sub-block to a high threshold voltage (Vt), the first set of non-data cell transistors connected to a first set of the plurality of conductive lines; and
establish a second set of non-data cell transistors on the NAND strings in the respective sub-block to a low Vt that is lower than the high Vt, the second set of non-data cell transistors connected to a second set of the plurality of conductive lines, wherein each sub-block in the selected block has a different pattern of high Vt and low Vt non-data cell transistors to enable separate selection of the respective sub-blocks; and
apply a set of voltages to the plurality of conductive lines to separately select the respective sub-blocks in the selected block, the set of voltages having a first voltage that is high enough to turn on a high Vt non-data cell transistor and a second voltage that is high enough to turn on a low Vt non-data cell transistor but is too low to turn on a high Vt non-data cell transistor.

16. The non-volatile storage system of claim 15, wherein the one or more control circuits are further configured to:
select the respective sub-blocks by:
applying a high voltage to the first set of the conductive lines connected to each high Vt non-data cell transistor of the selected sub-block to turn on the high Vt non-data cell transistors of the selected sub-block; and
applying a low voltage to the second set of the conductive lines connected to low Vt non-data cell transistors of the selected sub-block to turn on the low Vt non-data cell transistors of the selected sub-block, wherein the second set of the conductive lines is connected to at least one high Vt non-data cell transistor of each unselected sub-block to keep off the high Vt non-data cell transistors of the unselected sub-blocks.

17. The non-volatile storage system of claim 15, wherein the plurality of conductive lines are source side select lines immediately adjacent to the source line.

18. The non-volatile storage system of claim 15, wherein:
the plurality of conductive lines are dummy word lines; and
the one or more control circuits apply a voltage to source side select lines between the dummy word lines and the source line to turn on source side select gates when selecting the sub-blocks.

19. The non-volatile storage system of claim 15, wherein the plurality of conductive lines are drain side select lines immediately adjacent to bit lines.

20. The non-volatile storage system of claim 15, wherein:
the plurality of sub-blocks comprise m sub-blocks, wherein m is greater than a total number of the first set of the conductive lines and the second set of the conductive lines in the selected block.

* * * * *